(12) United States Patent
Oomura et al.

(10) Patent No.: US 7,771,133 B2
(45) Date of Patent: Aug. 10, 2010

(54) PRINT CONTROL APPARATUS CONNECTABLE TO A PRINTING APPARATUS AND INFORMATION PROCESSING APPARATUS, AND CONTROL METHOD THEREOF, AND COMPUTER PROGRAM

(75) Inventors: Hiroshi Oomura, Kawasaki (JP); Etsuko Maeda, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 636 days.

(21) Appl. No.: 11/741,092

(22) Filed: Apr. 27, 2007

(65) Prior Publication Data

US 2007/0263235 A1    Nov. 15, 2007

(30) Foreign Application Priority Data

Apr. 28, 2006    (JP) .............................. 2006-126930

(51) Int. Cl.
*B41J 29/38* (2006.01)
*G06F 3/12* (2006.01)
(52) U.S. Cl. .......................... 400/62; 400/76; 358/1.15; 358/1.16
(58) Field of Classification Search .................. 400/62, 400/76
See application file for complete search history.

(56) References Cited

U.S. PATENT DOCUMENTS

2005/0190399 A1    9/2005   Nakaoka et al.

2007/0104525 A1*   5/2007   Isshiki .......................... 400/62
2007/0182986 A1*   8/2007   Ciriza et al. ............... 358/1.15

FOREIGN PATENT DOCUMENTS

JP          8-244314 A      9/1996
JP          2005219225 A    8/2005

OTHER PUBLICATIONS

Japanese Office Action dated Apr. 28, 2008 issued in JP Patent Application No. 2006-126930.

* cited by examiner

*Primary Examiner*—Leslie J Evanisko
(74) *Attorney, Agent, or Firm*—Rossi, Kimms & McDowell LLP

(57) ABSTRACT

An apparatus being connectable to a printing apparatus and an information processing apparatus, comprising, a reception unit adapted to receive identification information used to identify the printing apparatus and used to specify a printer driver in the information processing apparatus, from the printing apparatus after connection to the printing apparatus, a storage unit adapted to store the identification information received by said reception unit, a transmission unit adapted to transmit the identification information stored in said storage unit to the information processing apparatus after connection to the information processing apparatus, a second reception unit adapted to receive print data generated in the information processing apparatus using a printer driver specified based on the identification information, from that information processing apparatus, and a second transmission unit adapted to transmit the print data received by said reception unit to the printing apparatus.

17 Claims, 18 Drawing Sheets

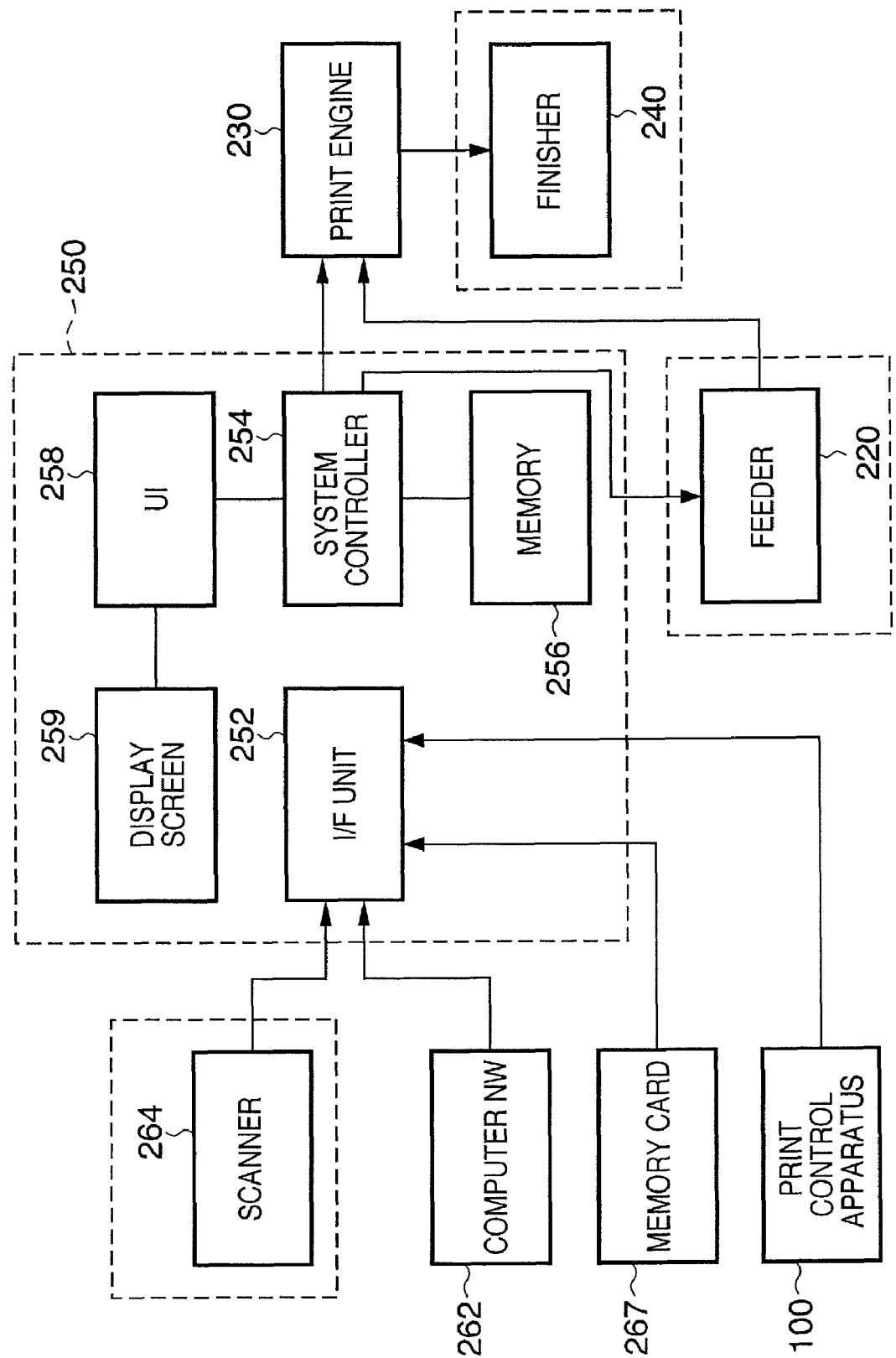

FIG. 12

| Job ID 1201 | Job name 1202 | NUMBER OF PAGES 1203 | PAGE ID 1204 | PAGE SIZE 1205 | RESULT 1206 | NUMBER OF OUTPUT PAGES 1207 | COMPLETION STATUS 1208 |
|---|---|---|---|---|---|---|---|
| 1 | AAA | 5 | 1 | A4 | DONE | 3 | N |
| | | | 2 | A4 | DONE | | |
| | | | 3 | A4 | DONE | | |
| | | | 4 | A4 | NOT YET | | |
| | | | 5 | A4 | NOT YET | | |
| 2 | BBB | 3 | 1 | A4 | NOT YET | 0 | N |
| | | | 2 | A3 | NOT YET | | |
| | | | 3 | A4 | NOT YET | | |

1200

F I G. 13A
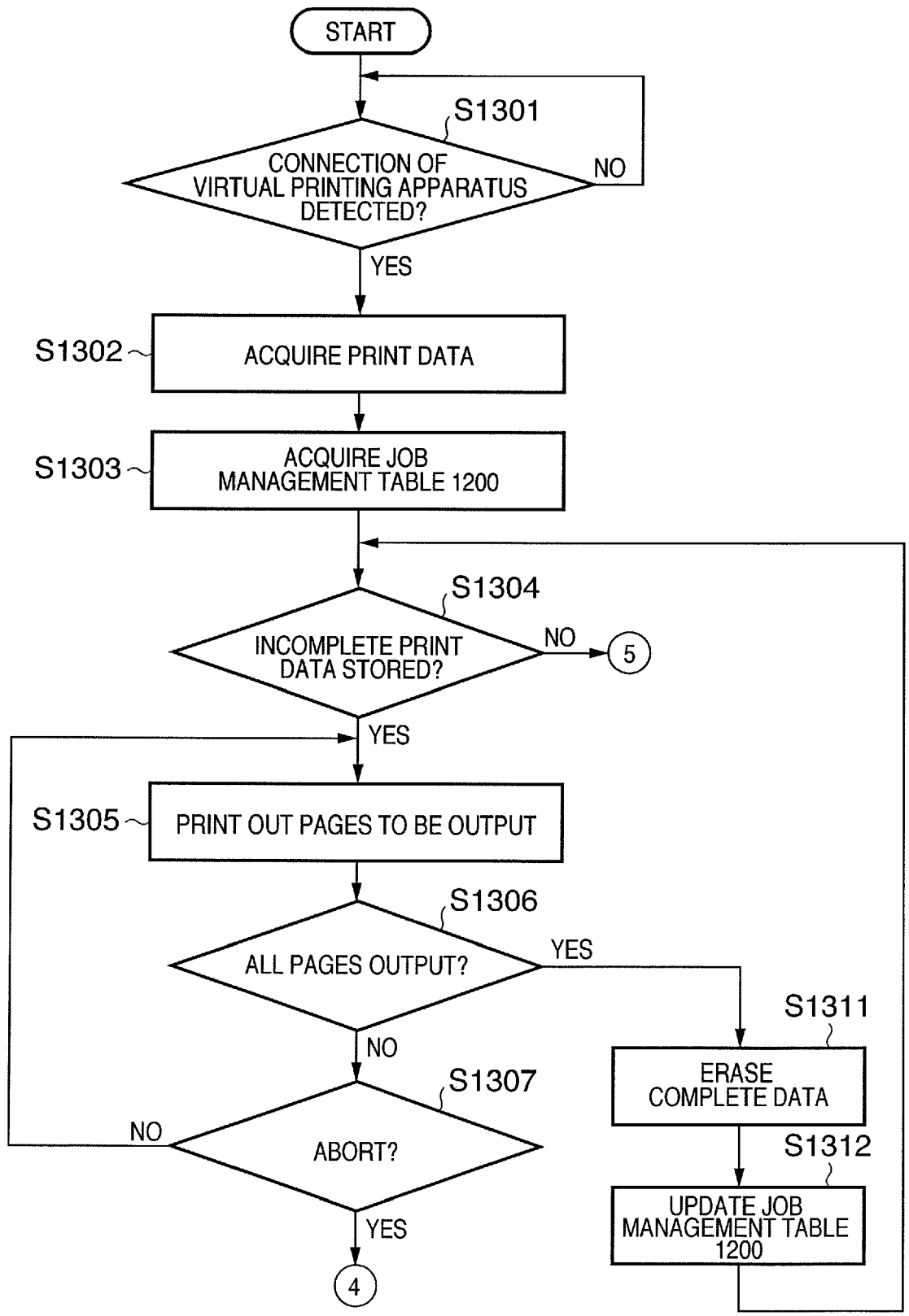

PRINT CONTROL APPARATUS CONNECTABLE TO A PRINTING APPARATUS AND INFORMATION PROCESSING APPARATUS, AND CONTROL METHOD THEREOF, AND COMPUTER PROGRAM

BACKGROUND OF THE INVENTION

1. Field of the Invention

The present invention relates to an apparatus being connectable to a printing apparatus and an information processing apparatus, and control method thereof, and a computer program.

2. Description of the Related Art

A printing apparatus has a command interface as a unique drawing language system such as a PDL (Page Description Language) or the like. This is to avoid the printing apparatus from relying on a specific information processing apparatus, an operating system (to be abbreviated as OS hereinafter) which runs on the information processing apparatus, or applications which run on the OS.

The command interface as the drawing language system depends on each individual printing apparatus. Hence, in order to encapsulate the dependence, the OS defines a printer driver as a module which has a standard drawing interface as an input, and converts the input into commands of the drawing language system depending on the printing apparatus and outputs the converted commands.

Such printer drivers are generally prepared by the manufacturers of printing apparatuses, OS developers, and the like, and are often pre-stored in the information processing apparatus. Since there are many printer drivers stored in the information processing apparatus, presentation of all these printer drivers to the user is potentially confusing.

Hence, it is desirable to efficiently connect printing apparatuses that the user uses to a communication path, and to set them to be usable by the user. For this reason, in an initial state of the OS, the printer drivers are merely stored in the information processing apparatuses, and the user installs a printer driver in the OS as an operation for linking that printer driver to a specific printing apparatus.

Conventionally, the user manually performs this installation operation. However, installing a printer driver is generally troublesome. When commands of a different drawing language system are transmitted to a printing apparatus which does not support the drawing language system, a print error occurs. Therefore, a printer driver corresponding to each printing apparatus must be correctly installed, and it is difficult for the beginner to carry out such operation.

In order to reduce the load on such troublesome installation operation, a plug-and-play (PnP) function is implemented in the OS. With this function, by directly connecting the information processing apparatus to a printing apparatus using a communication medium such as Centronics, USB, or the like, the information processing apparatus and printing apparatus automatically make two-way communications without any user's operations. Then, a driver corresponding to the printing apparatus is installed in the information processing apparatus.

Furthermore, a technique called universal plug-and-play (UPnP) is also implemented. With this technique, even when the information processing apparatus is connected to many unspecified printing apparatuses via a network, it searches for printing apparatuses on the network and automatically makes two-way communications with a printing apparatus designated by the user. Then, a driver corresponding to that printing apparatus is installed in the information processing apparatus.

Of the above PnP function, a physical connection is premised on a direct connection using a communication medium between the information processing apparatus and printing apparatus. For this reason, the information processing apparatus can easily specify the printing apparatus, but the distance from the information processing apparatus to the printing apparatus is limited to fall within a maximum transfer distance range of the communication medium used. That is, the degree of freedom in setting is restricted by the physical length of the connecting cable or the like used to connect these apparatuses, and the physical setting of the cable itself is also troublesome.

In case of the UPnP function via network connection, it is difficult to easily match the search result of printing apparatuses on the network with the physical setting location of each printing apparatus. When the information processing apparatus does not join the network, it requires a connection setting to the network for only use of the printing apparatus, resulting in cumbersome operations.

In order to reduce the load on the installation operation of a printer driver or to reduce the load on the connection setting operation to the network, print data may be stored in a portable storage medium (e.g., a USB memory) and may be printed (see Japanese Patent Laid-Open No. 8-244314). With this method, a printer driver need not be installed in the information processing apparatus, and no network setting is required. Unlike connection between the information processing apparatus and printing apparatus via a physical cable, the degree of freedom in the setting locations between these apparatuses is not diminished.

However, with the aforementioned prior art, data which is created in a general-purpose format that can be stored in a storage medium is stored in the storage medium. Hence, for example, functions unique to each individual printing apparatus such as a double-sided print setting, staple processing instruction, and the like cannot be sufficiently used. Also, data once stored in the storage medium can be printed out using every printing apparatus. For example, in an environment in which usable printing apparatuses are restricted for each user, it is difficult to manage the use authorities.

Therefore, the present invention has as its object to solve the problems of a printing system which executes print processing by storing data generated by an information processing apparatus in a storage medium, and connecting the storage medium to a printing apparatus. More specifically, the present invention allows such printing system to sufficiently use the functions of each printing apparatus and to manage the use authorities of printing apparatuses.

SUMMARY OF THE INVENTION

In order to solve the above problems, the present invention according to one aspect of preferred embodiments relates to an apparatus being connectable to a printing apparatus and an information processing apparatus, comprising, a reception unit adapted to receive identification information used to identify the printing apparatus and used to specify a printer driver in the information processing apparatus, from the printing apparatus after connection to the printing apparatus, a storage unit adapted to store the identification information received by the reception unit, a transmission unit adapted to transmit the identification information stored in the storage unit to the information processing apparatus after connection to the information processing apparatus, a second reception unit adapted to receive print data generated in the information processing apparatus using a printer driver specified based on the identification information, from that information processing apparatus, and a second transmission unit adapted to transmit the print data received by the reception unit to the printing apparatus.

In order to solve the above problems, the present invention according to another aspect of preferred embodiments relates to an apparatus being connectable to a printing apparatus and an information processing apparatus, comprising, a reception unit adapted to receive identification information used to identify the printing apparatus and a printer driver corresponding to the printing apparatus, from the printing apparatus after connection to the printing apparatus, a storage unit adapted to store the identification information and the printer driver received by the reception unit, a transmission unit adapted to transmit the identification information and the printer driver stored in the storage unit to the information processing apparatus after connection to the information processing apparatus, a second reception unit adapted to receive print data generated in the information processing apparatus using the printer driver transmitted by the transmission unit, from the information processing apparatus, and a second transmission unit adapted to transmit the print data received by the reception unit to the printing apparatus.

In order to solve the above problems, the present invention according to still another aspect of preferred embodiments relates to an apparatus being connectable to a printing apparatus, an information processing apparatus, and a network, comprising, a reception unit adapted to receive identification information used to identify the printing apparatus and connection information required to connect the printing apparatus via the network after connection to the printing apparatus, a storage unit adapted to store the identification information received by the reception unit, a transmission unit adapted to transmit the identification information stored in the storage unit to the information processing apparatus after connection to the information processing apparatus, a second reception unit adapted to receive print data generated in the information processing apparatus using a printer driver specified based on the identification information, from that information processing apparatus, and a second transmission unit adapted to transmit the print data received by the reception unit to the printing apparatus via the network based on the connection information.

Further features of the present invention will become apparent from the following description of exemplary embodiments with reference to the attached drawings.

BRIEF DESCRIPTION OF THE DRAWINGS

FIG. 2B is a block diagram showing an example of the hardware arrangement of a printing apparatus 200 according to the first embodiment of the present invention;

FIG. 12 shows an example of the data configuration of a job management table 1200 according to the fourth embodiment of the present invention; and FIGS. 13A and 13B are flowcharts showing an example of the processing of a printing apparatus 200 according to the fourth embodiment of the present invention.

DESCRIPTION OF THE EMBODIMENTS

Preferred embodiments of the present invention will now be described with reference to the accompanying drawings.

First Embodiment

Figure 1:
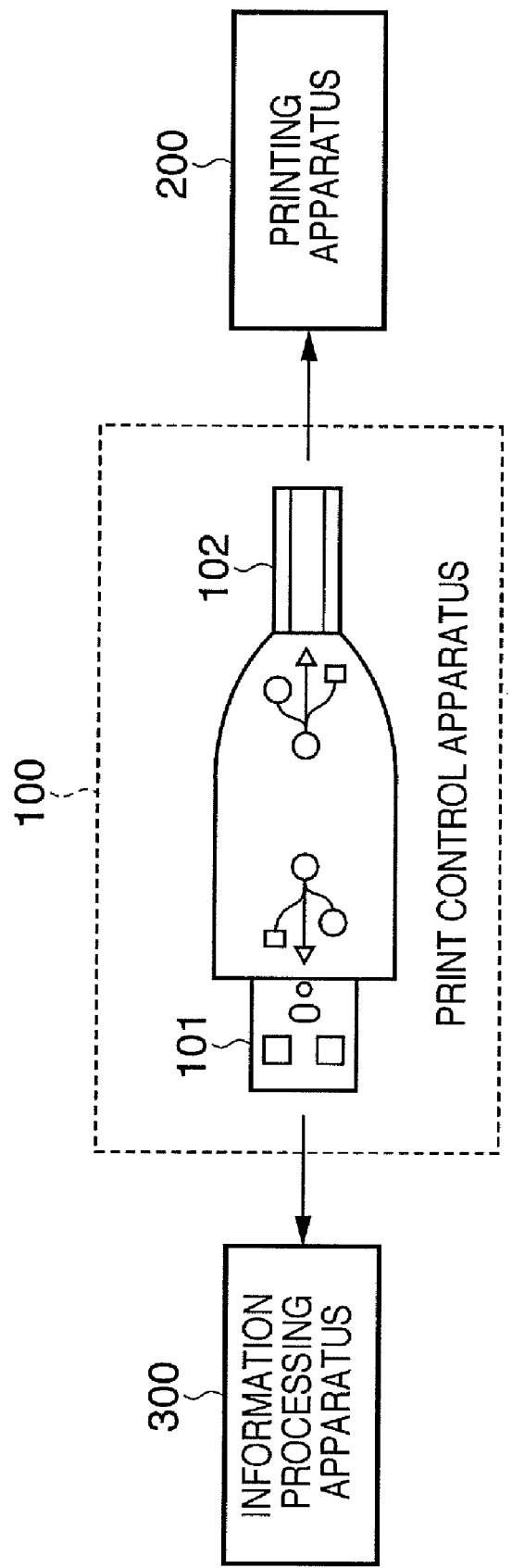
FIG. 1 is a block diagram showing an example an overview of a print control apparatus 100 according to the first embodiment of the present invention.

FIG. 1 shows an example of an overview arrangement of a print control apparatus according to this embodiment. In a print control apparatus 100, a connector 101 is a USB host-side connector which can be connected to an information processing apparatus 300 such as a personal computer or the like. A connector 102 is a USB device-side connector which can be connected to a device such as a printing apparatus 200 or the like.

In this embodiment, the print control apparatus 100 is connected to the printing apparatus 200 via the connector 102, and acquires identification information required to identify the printing apparatus 200. The identification information required to identify the printing apparatus is, e.g., a device ID. The print control apparatus 100 passes the identification information to the information processing apparatus 300 via the connector 101. The information processing apparatus 300 selects a printer driver for the printing apparatus 200 based on the identification information acquired from the print control apparatus 100. The information processing apparatus 300 generates print data using the selected printer driver. When the information processing apparatus does not have any suited printer driver, it acquires the printer driver from the print control apparatus 100. The print data generated by the information processing apparatus is stored in the print control apparatus 100. After that, when the print control apparatus 100 is connected to the printing apparatus via the connector 102, it passes the previously acquired identification information of the printing apparatus to the printing apparatus, and then transmits the print data to the printing apparatus under the condition that the identification information matches.

Note that the print control apparatus of the present invention is preferably a portable device by the user such as a USB memory device (to be referred to as a USB memory hereinafter), a mobile phone, a PDA (Personal Digital Assistants), and the like. This embodiment will give the following explanation using the USB memory as the print control apparatus.

Figure 2A:
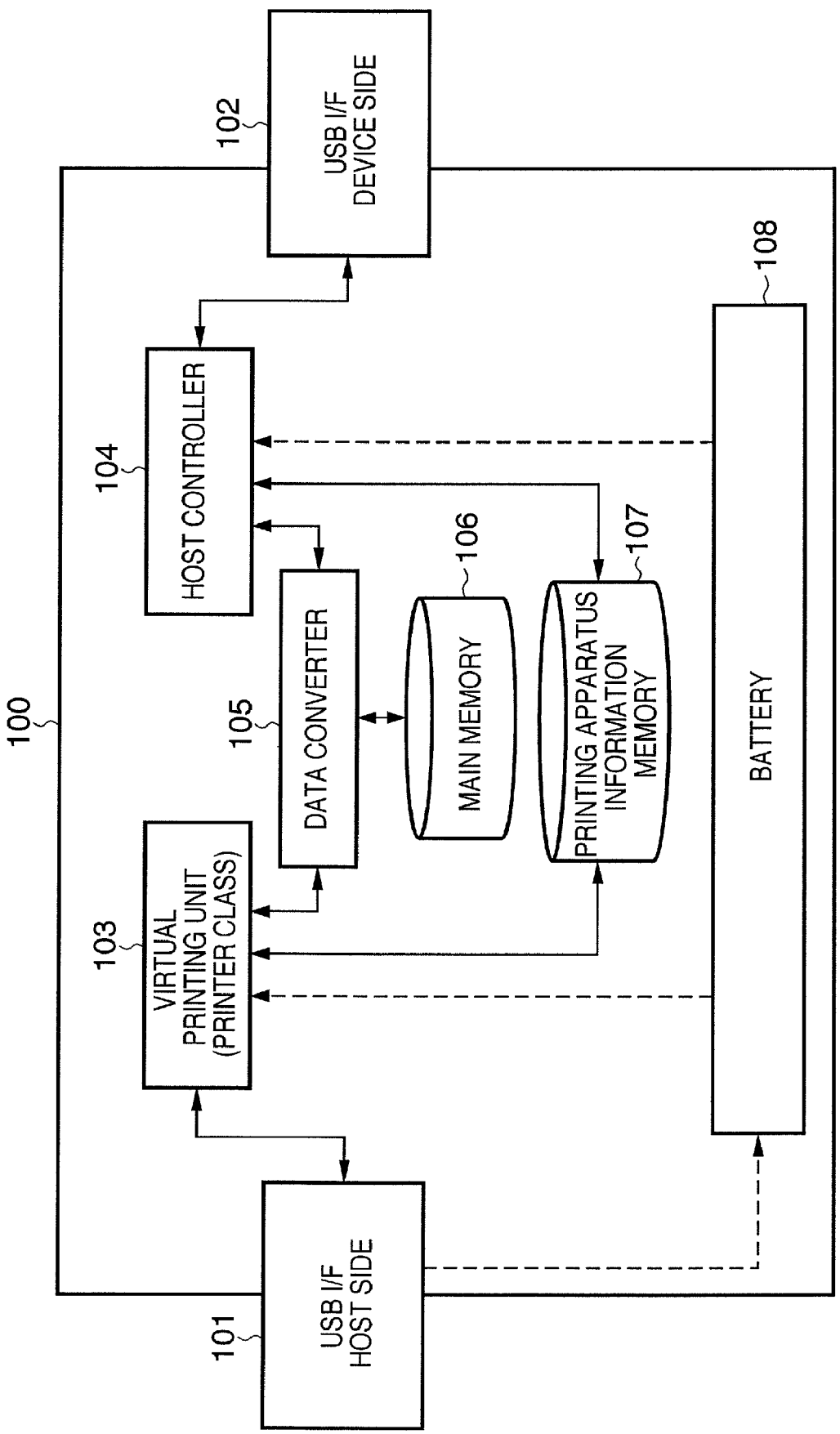
FIG. 2A is a block diagram showing an example of the arrangement of the print control apparatus 100 according to the first embodiment of the present invention.

An example of the arrangement of the print control apparatus 100 will be described below with reference to FIG. 2A. Referring to FIG. 2A, the connector 101 is located at a USS I/F (host side). With this connector 101, the print control apparatus can execute communication processing with the information processing apparatus as a host apparatus.

The connector 102 is located at a USB I/F (peripheral device side). With this connector, the print control apparatus can execute communication processing with the printing apparatus as a peripheral device.

A virtual printing unit 103 is a processor which implements the operation of a USB printer class. More specifically, when the host-side connector 101 is connected to the host apparatus, the virtual printing unit 103 executes initialization and communications of USB connection including the same PnP operation as in the case wherein the printing apparatus is connected to the host, in place of the printing apparatus.

A host controller 104 is a processor which implements the USB host-side operation. When the device-side connector 102 is connected to the printing apparatus, the host controller 104 operates as if the information processing apparatus were directly connected to the printing apparatus, in place of the information processing apparatus. More specifically, the host controller 104 executes host-side initialization processing of USB connection, reading of PnP information of the printing apparatus, and output of print data to the printing apparatus if the print data is stored in the print control apparatus 100 after connection.

A data converter 105 executes processing for converting print data input from the host-side connector 101 to the print control apparatus 100 into a format that a main memory 106 can store, and storing the converted print data in the main memory 106. When the device-side connector 102 is connected to the printing apparatus, the data converter 105 also serves to convert the print data stored in the main memory 106 into a format that allows transfer via a communication medium of USB connection, and to pass the converted print data to the host controller 104.

The main memory 106 is a storage device which stores data such as print data which is exchanged between the information processing apparatus and printing apparatus to attain a print operation. The main memory 106 may also store information to be passed from the printing apparatus to the information processing apparatus such as device configuration information (e.g., the configuration of a finisher and the like) associated with the printing apparatus. Furthermore, the main memory 106 may store information indicating the status of the printing apparatus.

A printing apparatus information memory 107 is a memory which saves information exchanged to establish connection between the printing apparatus and computer upon initializing USB connection between the information processing apparatus and printing apparatus, i.e., information such as a device ID in the IEEE1284.4 format and the like. Also, the printing apparatus information memory 107 stores a printer driver for a given printing apparatus, which is acquired from that printing apparatus.

A battery 108 supplies electric power to assure the operation upon connection of the device-side connector 102 to the printing apparatus when the device side is not a self-power device that incorporates its own power supply (in case of a bus-power device). The battery 108 may be charged when the host-side connector 101 is connected to the information processing apparatus. The battery 108 may not be included when the system is configured premised on the self-power device.

An example of the hardware arrangement of the printing apparatus 200 will be described below with reference to FIG. 2B.

A controller 250 includes an interface unit 252, system controller 254, memory 256, and user interface (UI) 258. Of these units, the system controller 254 receives print engine information including page count information from sensors of the entire printing apparatus 200.

The printing apparatus 200 can receive print data via a computer network 262. The computer network 262 includes appropriate communication media such as, e.g., a telephone line, computer cable, ISDN line, radio transmission, optical fiber, and the like.

Print data to be received is data in a job format including image data in a mode as a set of a plurality of digital pages and processing instructions. The print data is described in a page description language (PDL) used by the printing apparatus 200.

When the PDL that describes the print data is different from that used in the printing apparatus 200, a conversion unit may convert the input PDL into that corresponding to the printing apparatus 200. Such conversion unit may be incorporated in the interface (I/F) unit 252 in the controller 250.

This interface unit 252 includes a network interface, FDD interface, memory card interface, USB interface, and scanner interface.

That is, a remote image data source other than the computer network 262 includes a memory card 267 and a USB flash memory (USB memory) 100 as the print control apparatus according to this embodiment. Note that log information and the like may be written in these memories. A scanner 264 is a scanning means for optically scanning document information, and converting the scanned information into image data, and provides the scanned image data to the controller 250 via the interface unit 252.

The memory 256 stores data received via the interface unit 252 or data used to perform display on a display screen 259 via the user interface 258. Also, the memory 256 stores control programs required for the system controller 254 to control the operations of the printing apparatus 200, and may be used as a work area of the system controller 254. Furthermore, the memory 256 stores a device ID used to identify the self apparatus, a printer driver for the self apparatus, and the like. The device ID and printer driver are input to the print control apparatus via the I/F unit 252 when the print control apparatus is connected.

A feeder 220 preferably includes one or more trays that feed various types of carrier materials to a print engine 230.

The user interface 258 accepts instruction inputs from an operator of the printing apparatus 200 via the display screen 259, and transfers information to the operator by controlling display information on the display screen 259. More specifically, the user interface 258 can navigate a series of menus when the operator highlights, clicks, double-clicks, or opens one section of a graphic expression of the user interface 258. The user interface 258 allows the operator to monitor the document feeder 220, the print engine 230, and a finisher 240 by displaying information and control associated with the printing apparatus 200.

The print engine 230 is a print processor which prints print data on a print medium such as a print sheet and the like, and its print system is not particularly limited. That is, the print engine 230 may adopt a laser beam system, an electrophotography system (e.g., an LED system) other than the laser beam system, or other print systems such as a liquid-crystal shutter system, ink-jet system, thermal transfer system, dye sublimation system, and the like.

An example of the hardware arrangement of the information processing apparatus 300 will be described below with reference to FIG. 2C. The information processing apparatus 300 can comprise a general-purpose personal computer.

Figure 2C:
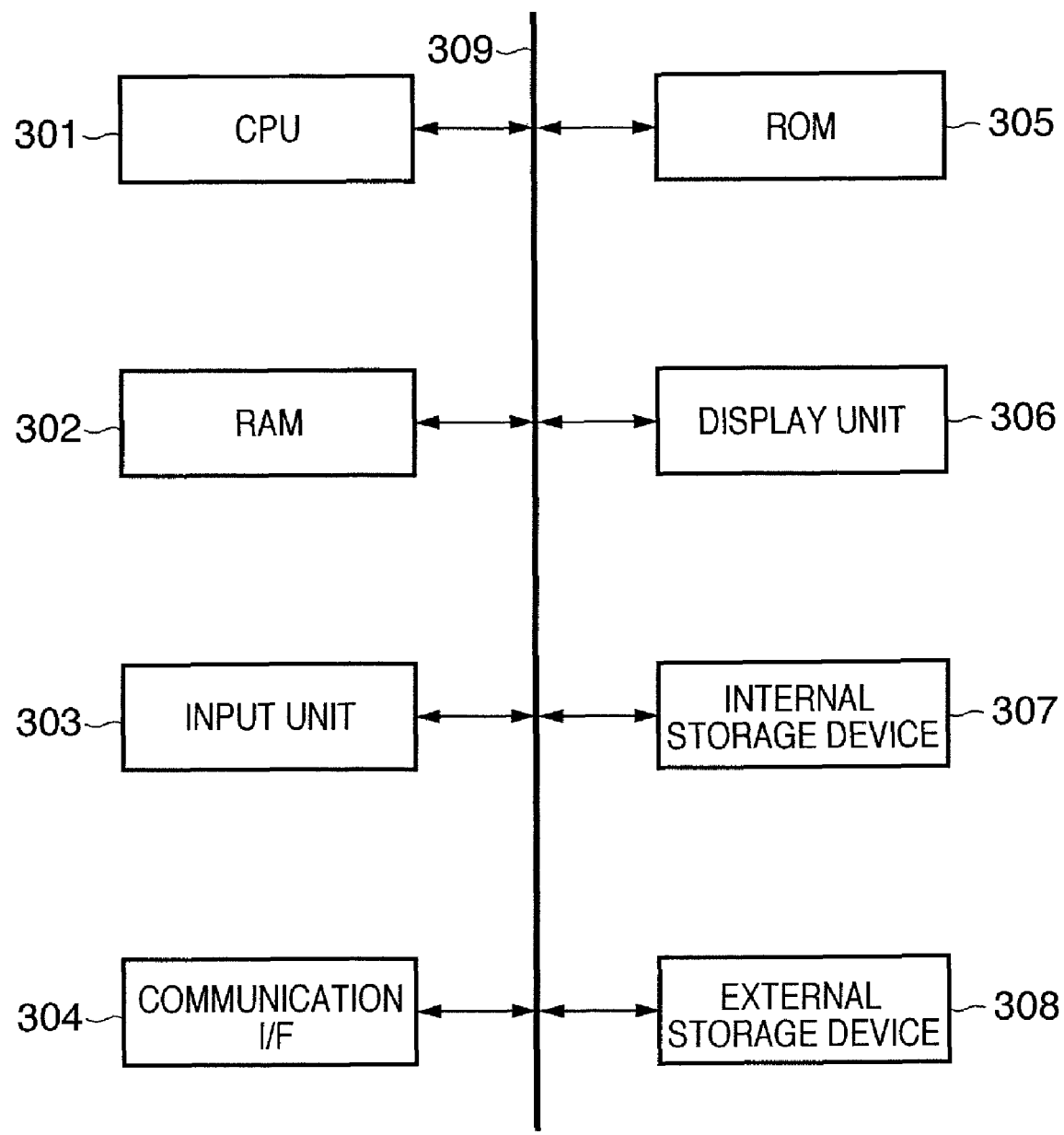
FIG. 2C is a block diagram showing an example of the hardware arrangement of an information processing apparatus 300 according to the first embodiment of the present invention.

Referring to FIG. 2C, reference numeral 301 denotes a CPU which controls the information processing apparatus 300 using programs, data, and the like stored in a RAM (random access memory) 302 and ROM (read-only memory) 305, and implements processing according to the present invention. Reference numeral 302 denotes a RAM which comprises an area for loading processing programs stored in an internal storage device 307 and information stored in an external storage device 308, and also a work area used when the CPU 301 executes various kinds of processing.

Reference numeral 303 denotes an input unit which accepts inputs from the user of the information processing apparatus 300, and comprises a keyboard, mouse, and the like. Reference numeral 304 denotes a communication I/F (interface), which connects a telephone network, the Internet, and the like, and serves as an I/F used to connect the USB memory as the print control apparatus 100 of the present invention. Reference numeral 305 denotes a ROM which stores programs (e.g., a boot program and the like) and the like used to control the overall information processing apparatus 300. Reference numeral 306 denotes a display unit as a display screen, which comprises a CRT, liquid crystal display, or the like.

Reference numeral 307 denotes an internal storage device which mainly comprises a hard disk, and stores programs required to implement processing according to this embodiment, various application data, printer drivers, and the like. The data stored in the internal storage device 307 are loaded onto the RAM 302 as needed. Reference numeral 308 denotes an external storage device. Reference numeral 309 denotes a bus which interconnects the aforementioned units.

Figure 3:
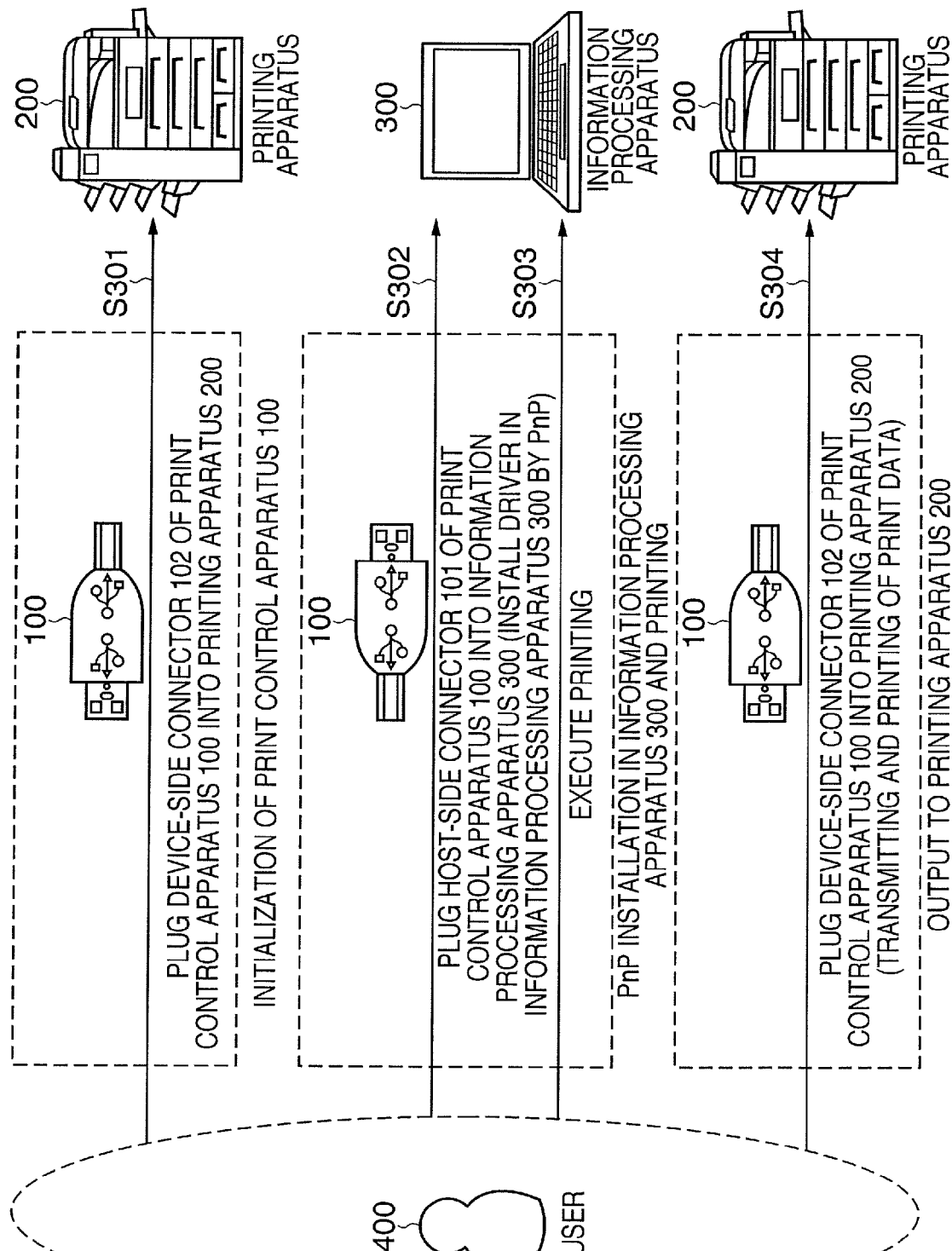
FIG. 3 is a sequence chart showing the procedure of the overall processing according to the first embodiment of the present invention.

The procedure of the overall processing in this embodiment will be described below with reference to the sequence chart of FIG. 3 as a user scenario. This scenario is roughly classified into the following three steps.

<Initialization of Print Control Apparatus 100>

In step S301, a user 400 plugs the device-connector 102 of the print control apparatus 100 to the printing apparatus 200 that he or she wants to execute a print operation. At this time, USB connection is initialized between the host controller 104 and printing apparatus 200. At the time of this initialization, information required for communications of USB connection such as the device ID in the IEEE1284.4 format and the like and a printer driver for the printing apparatus 200 are saved in the printing apparatus information memory 107.

The user 400 unplugs the print control apparatus from the printing apparatus 200 upon completion of initialization. A method of deciding whether or not initialization is complete is not particularly limited. For example, the user may measure a time required for initialization by himself or herself, an LED indicating an initialization timing may be provided to the print control apparatus 100, or a panel may be provided to the printing apparatus side.

PnP Installation in Information Processing Apparatus 300 and Printing

In step S302, the user 400 plugs the host-side connector 101 of the print control apparatus 100 into the information processing apparatus 300 that he or she wants to execute a print operation. At the time of this connection, the virtual printing unit 103 establishes USB connection using USB connection-related information unique to the printing apparatus 200, which is stored in step S301 "initialization of print control apparatus" and included in the printing apparatus information memory 107. The USB connection-related information unique to the printing apparatus 200 includes the device ID in the IEEE1284.4 format. The information processing apparatus which has acquired the device ID checks if a printer driver for the printing apparatus corresponding to this device ID has already been installed in itself. If it is determined that the printer driver is not installed, the information processing apparatus requests the print control apparatus to install the printer driver. In response to this request, the print control apparatus installs the printer driver stored in the printing apparatus information memory 107 in the information processing apparatus.

In step S303, the user 400 designates the printer driver which is automatically installed via PnP, and executes a print operation from an application. The virtual printing unit 103 receives print data generated at that time from the information processing apparatus 300, and the data converter 105 converts the received print data into the format that the main memory 106 can store and stored the converted print data in the main memory 106. The user 400 confirms if there is no data in a print queue of the information processing apparatus 300, and unplugs the print control apparatus 100 from the information processing apparatus 300. When the print control apparatus 100 has an LED, that LED may indicate completion of the communication.

<Output to Printing Apparatus 200>

In step S304, the user 400 plugs the device-side connector 102 of the print control apparatus 100 into the printing apparatus 200 that he or she wants to execute the print operation. The host controller 104 executes initialization processing of USB communications. In this case, the print control apparatus transmits the device ID of the printing apparatus stored in the printing apparatus information memory 107 to the printing apparatus 200. The printing apparatus 200 checks if the received device ID matches its own device ID. If it is determined that the two device IDs match, the printing apparatus 200 notifies the print control apparatus 100 of permission of reception of print data. Upon reception of this notification, the print control apparatus 100 converts print data from the format that the main memory 106 can record into data of a format suited to USB communications using the data converter 105 when the print data is stored in the main memory 106. The converted data is output to the printing apparatus 200 using the host controller 104.

Figure 4:
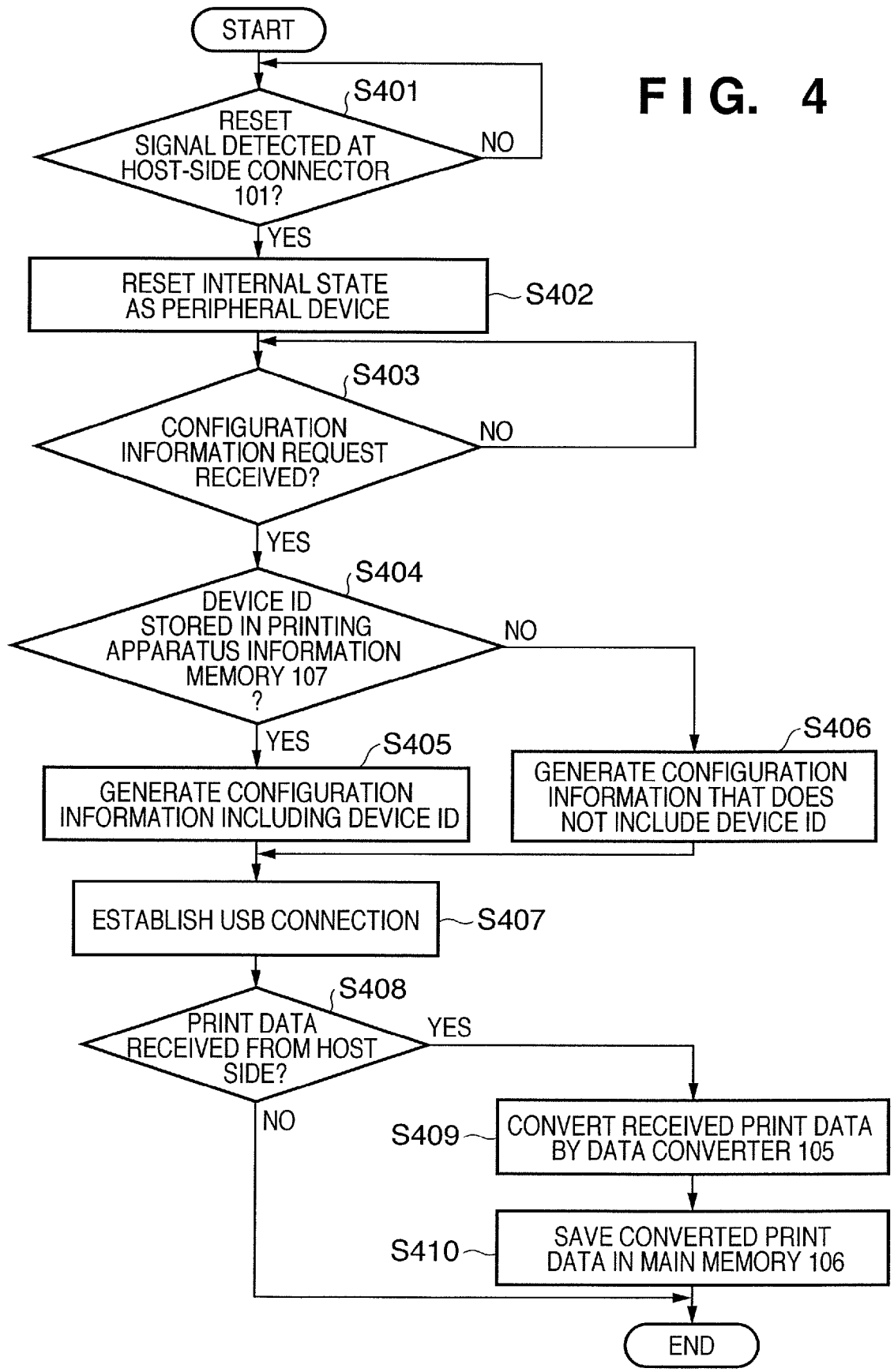
FIG. 4 is a flowchart showing an example of the processing in a virtual printing unit 103 of the print control apparatus 100 according to the first embodiment of the present invention.

The procedure of the processing in the virtual printing unit 103 will be described below with reference to FIG. 4. The virtual printing unit 103 periodically repeats the following processing.

The virtual printing unit 103 monitors in step S401 if the host-side connector 101 of the print control apparatus 100 detects a RESET signal sent from the information processing apparatus 300. If the RESET signal is detected ("YES" in step S401), the process advances to step S402. On the other hand, if the RESET signal is not detected ("NO" in step S401), the virtual printing unit 103 continues to monitor detection.

In step S402, the virtual printing unit 103 recognizes a RESET state upon detection of the RESET signal, and executes USB communication-related internal reset processing to set a Default state. In this case, the virtual printing unit 103 does not change information stored in the printing apparatus information memory 107, but it may delete information stored in the main memory 106.

The virtual printing unit 103 checks in step S403 if a request of configuration information is received from the information processing apparatus 300. If the request is received ("YES" in step S403), the process advances to step S404. If the request is not received ("NO" in step S403), the virtual printing unit 103 continues to monitor.

The virtual printing unit 103 checks in step S404 if the printing apparatus information memory 107 stores the device ID and the like of the printing apparatus 200. If the printing apparatus information memory 107 stores the device ID and the like ("YES" in step S404), the process advances to step S405. If the printing apparatus information memory 107 does not store the device ID and the like ("NO" in step S404), the process advances to step S406.

In step S405, the virtual printing unit 103 generates USB configuration information using the device ID and the like of the printing apparatus 200 stored in the printing apparatus information memory 107. On the other hand, in step S406, the virtual printing unit 103 generates information indicating that no device ID is stored, and transmits it to the information processing apparatus. Upon reception of this information, the information processing apparatus 300 displays a message "no printer is specified" or the like on the display screen to prompt the user to connect the print control apparatus 100 to the printing apparatus.

In step S407, the virtual printing unit 103 transmits the configuration information generated in step S405 to the information processing apparatus 300 via the host-side connector 101 to perform configuration, thus establishing USB connection. More specifically, upon acquiring the device ID included in the configuration information, the information processing apparatus 300 side checks if a printer driver for a printing apparatus corresponding to that device ID has already been installed. If the printer driver has already been installed, the information processing apparatus 300 specifies that printer driver. On the other hand, if the printer driver has not been installed yet, the information processing apparatus 300 sends a message that advises accordingly to the print control apparatus 100. Upon reception of this message, the print control apparatus 100 installs the printer driver for the printing apparatus 200 stored in the printing apparatus information memory 107 in the information processing apparatus.

The virtual printing unit 103 checks in step S408 if print data is received from the information processing apparatus 300 as a host apparatus. If print data is received ("YES" in step S408), the process advances to step S409. On the other hand, if print data is not received ("NO" in step S408), the virtual printing unit 103 ends the processing. Note that the print data is generated by the printer driver for the printing apparatus 200 in the information processing apparatus 300. That is, the user who operates the information processing apparatus does not merely store a data file in the print control apparatus, but he or she can generate print data with desired print settings using the printer driver for the printing apparatus whose device ID is stored in the print control apparatus.

In step S409, the virtual printing unit 103 converts the print data received via the host-side connector 101 using the data converter 105. In step S410, the virtual printing unit 103 stores the converted print data in the main memory 106. After that, the virtual printing unit 103 ends processing.

Figure 5A:
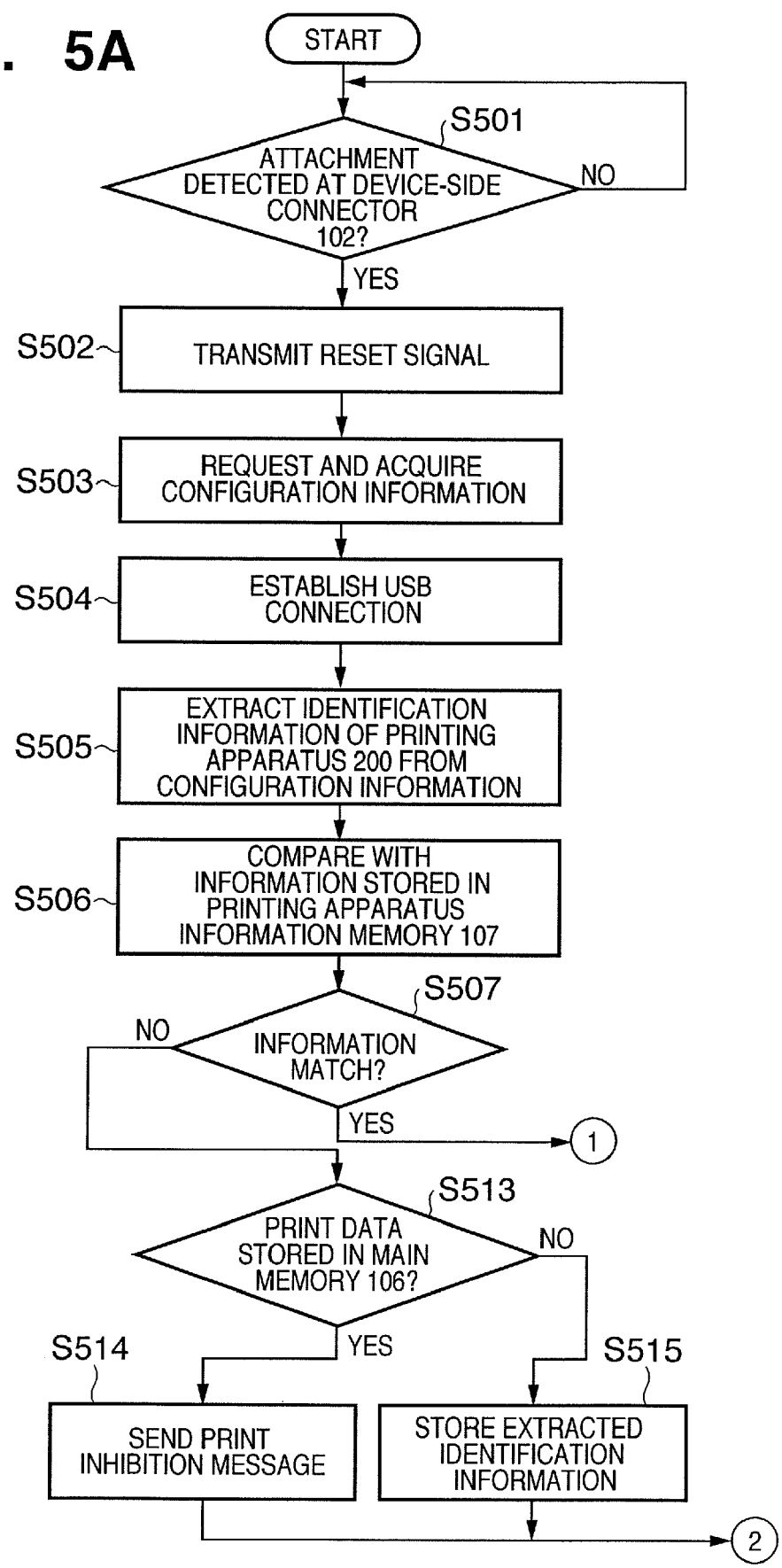
FIGS. 5A and 5B are flowcharts showing an example of the processing in a host controller 104 of the print control apparatus 100 according to the first embodiment of the present invention.
Figure 5B:
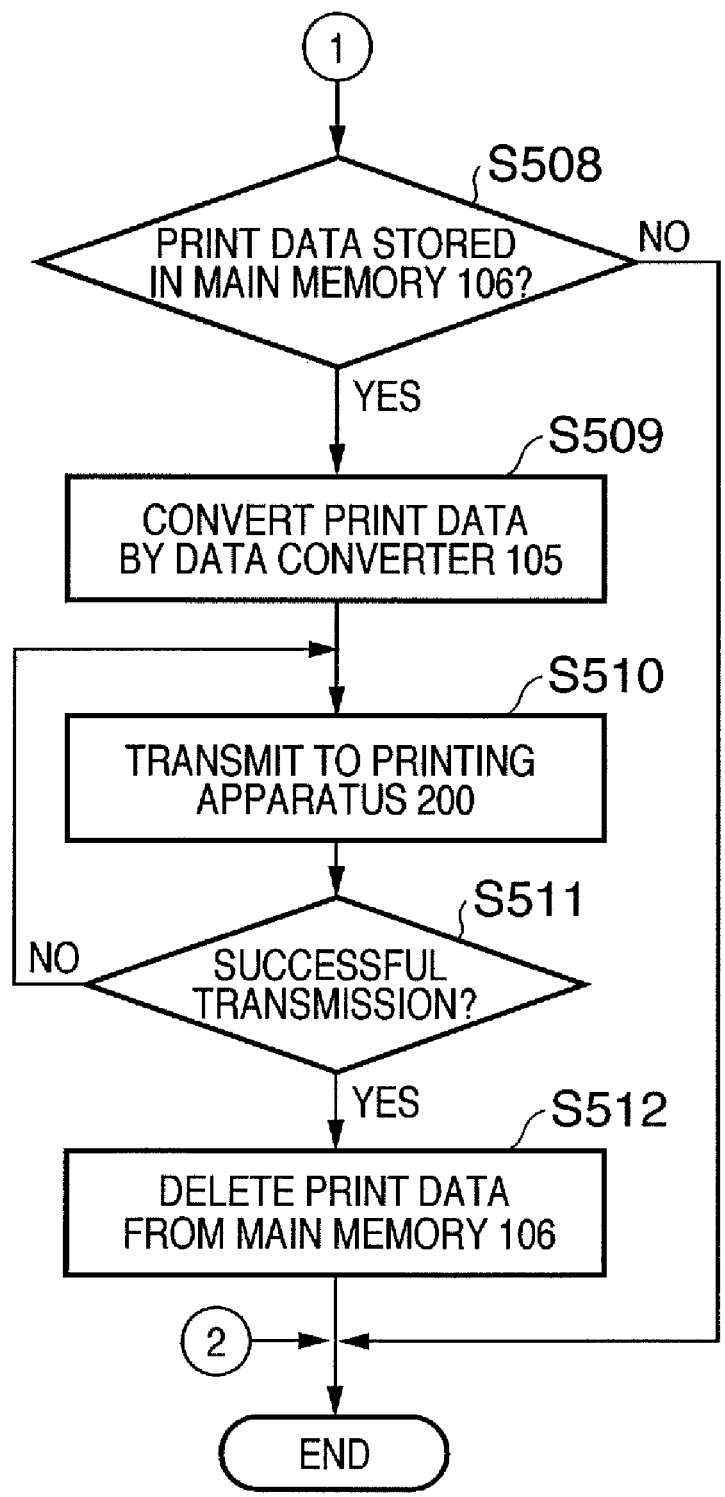

The procedure of the processing of the host controller 104 in the print control apparatus 100 will be described below with reference to FIGS. 5A and 5B. The host controller 104 periodically repeats the following processing.

The host controller 104 monitors in step S501 if attachment to the printing apparatus 200 is detected on the device-side connector 102 side of the print control apparatus 100. If attachment is detected ("YES" in step S501), the process advances to step S502. On the other hand, if attachment is not detected ("NO" in step S501), the host controller 104 continues to monitor.

Since the device is attached, the host controller 104 outputs a RESET signal to the printing apparatus 200 as the device for a predetermined period of time or more in step S502. The printing apparatus 200 side recognizes a RESET state based on the RESET signal sent from print control apparatus 100, and executes internal reset processing to set a Default state.

Next, in step S503 the host controller 104 sends a request of USB configuration information to the printing apparatus 200, and acquires the configuration information from the printing apparatus 200. In step S504, the host controller 104 establishes USB connection based on the acquired configuration information.

In step S505, the host controller 104 extracts identification information required to identify the printing apparatus such as a device ID in the IEEE1284.4 format and the like from the configuration information acquired from the printing apparatus 200. In step S506, the host controller 104 compares the extracted device ID with that stored in the printing apparatus information memory 107. As a result of comparison, if the device ID stored in the printing apparatus information memory 107 matches the contents of the extracted device ID ("YES" in step S507), the process advances to step S508. On the other hand, if the acquired device ID is different from the stored device ID, or if the printing apparatus information memory 107 does not store any device ID ("NO" in step S507), the process advances to step S513.

The host controller 104 checks in step S508 if the main memory 106 stores print data. If the main memory 106 stores print data ("YES" in step S508), the process advances to step S509. On the other hands if the main memory 106 does not store any print data ("NO" in step S508), the host controller 104 ends the processing.

The host controller 104 converts the print data stored in the main memory 106 using the data converter 105 in step S509, and transmits the converted print data to the printing apparatus 200 via the device-side connector 102 in step S510.

The host controller 104 checks in step S511 if the transmission of print data has succeeded. If the transmission has succeeded ("YES" in step S511), the host controller 104 deletes the print data stored in the main memory 106 in step S512, and ends this processing. If the transmission has failed ("NO" in step S511), the host controller 104 repeats transmission processing.

At this time, the printing apparatus 200 side to which the print data is output executes print processing based on the acquired print data.

If it is determined in step S507 that the acquired device ID is different from the stored device ID or if the printing apparatus information memory 107 does not store any device ID, the process advances to step S513. The host controller 104 checks in step S513 if the main memory 106 stores print data. If the main memory 106 stores print data ("YES" in step S513), the process advances to step S514. On the other hand, if the main memory 106 does not store any print data ("NO" in step S513), the process advances to step S515.

In step S514, the host controller 104 transmits, to the printing apparatus 200, a message indicating that print data cannot be transmitted, and ends the processing. Upon reception of this message, the printing apparatus 200 displays a message "printing is inhibited" or the like on the display screen to inform the user that printing cannot be done using this printing apparatus. That is, the print control apparatus of this embodiment controls to inhibit printing unless a printing apparatus from which a device ID was acquired in advance is the same as a printing apparatus that the user wants to execute printing. In this way, print data stored in the print control apparatus can be prevented from being printed by every printing apparatuses, thus providing an effect upon managing the use authorities of the printing apparatuses.

In step S515, the host controller 104 stores the device ID extracted in step S505 in the printing apparatus information memory 107, and ends the processing. If the printing apparatus information memory 107 has already stored another device ID, the host controller 104 overwrites that device ID on the device ID extracted in step S505. If the printing apparatus information memory 107 does not store another device ID, the host controller 104 newly stores the device ID extracted in step S505.

In this embodiment, in order to inhibit printing when the device ID stored in the print control apparatus does not match that of the printing apparatus, the print control apparatus side makes such decision and control. However, the printing apparatus side may make this decision and control. In this case, the print control apparatus and printing apparatus operate as follows.

The print control apparatus 100 notifies the printing apparatus of the device ID stored in the printing apparatus information memory 107 and the fact of storage of print data in the main memory 106. Upon reception of this notification, the printing apparatus compares the received device ID with its own device ID to check if they match. If it is determined that the two device IDs match, the printing apparatus transmits a print permission message to the print control apparatus. On the other hand, if the two device IDs do not match, the printing apparatus sends a print inhibition message to the print control apparatus, and displays a message "printing is inhibited" or the like on the display screen. Upon reception of the print permission message, the print control apparatus transmits the print data stored in the main memory 106 to the printing apparatus. On the other hand, upon reception of the print inhibition message, the print control apparatus does not transmit any print data.

Using this method as well, print data stored in the print control apparatus can be prevented from being printed by every printing apparatuses.

As described above, according to this embodiment, the USB memory is used as the print control apparatus, and can be controlled to install a printer driver corresponding to the printing apparatus in the information processing apparatus. Or the print control apparatus can be controlled to select an optimal printer driver from those installed in the information processing apparatus. Print data generated using that printer driver is stored in the USB memory, and is supplied to the printing apparatus via the USE memory, thus executing print processing of the print data.

In this way, print processing can be executed without the intervention of any physical connection by means of a cable or the like or the network between the information processing apparatus and printing apparatus. At this time, in place of simply storing image data in the USB memory and inputting that image data to the printing apparatus, print data in the PDL format can be stored in the USB memory from the information processing apparatus via the printer driver. Therefore, the user can make desired print settings such as staple processing, double-sided printing, and the like for print data. If device IDs do not match, since printing is inhibited, it can be managed to prevent the user from executing printing using arbitrary printing apparatuses.

Second Embodiment

Figure 6:
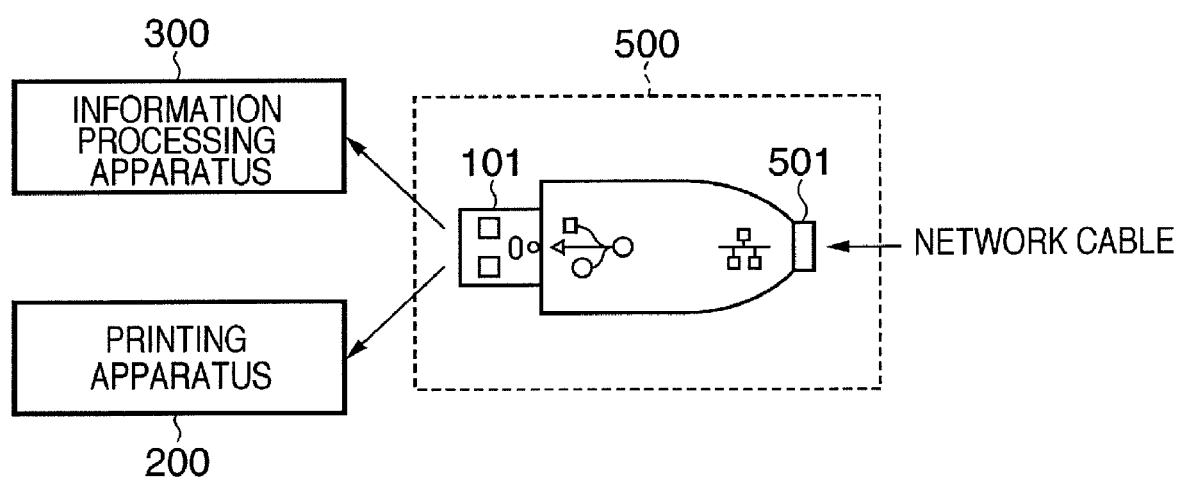
FIG. 6 is a block diagram showing an example of an overview of a print control apparatus 500 according to the second embodiment of the present invention.

A print control apparatus according to this embodiment will be described below with reference to FIG. 6. A print control apparatus 500 has a host computer-side USB connector 101 which can be connected to an information processing apparatus 300, a network cable connector 501 used to connect a LAN cable or the like.

Figure 7:
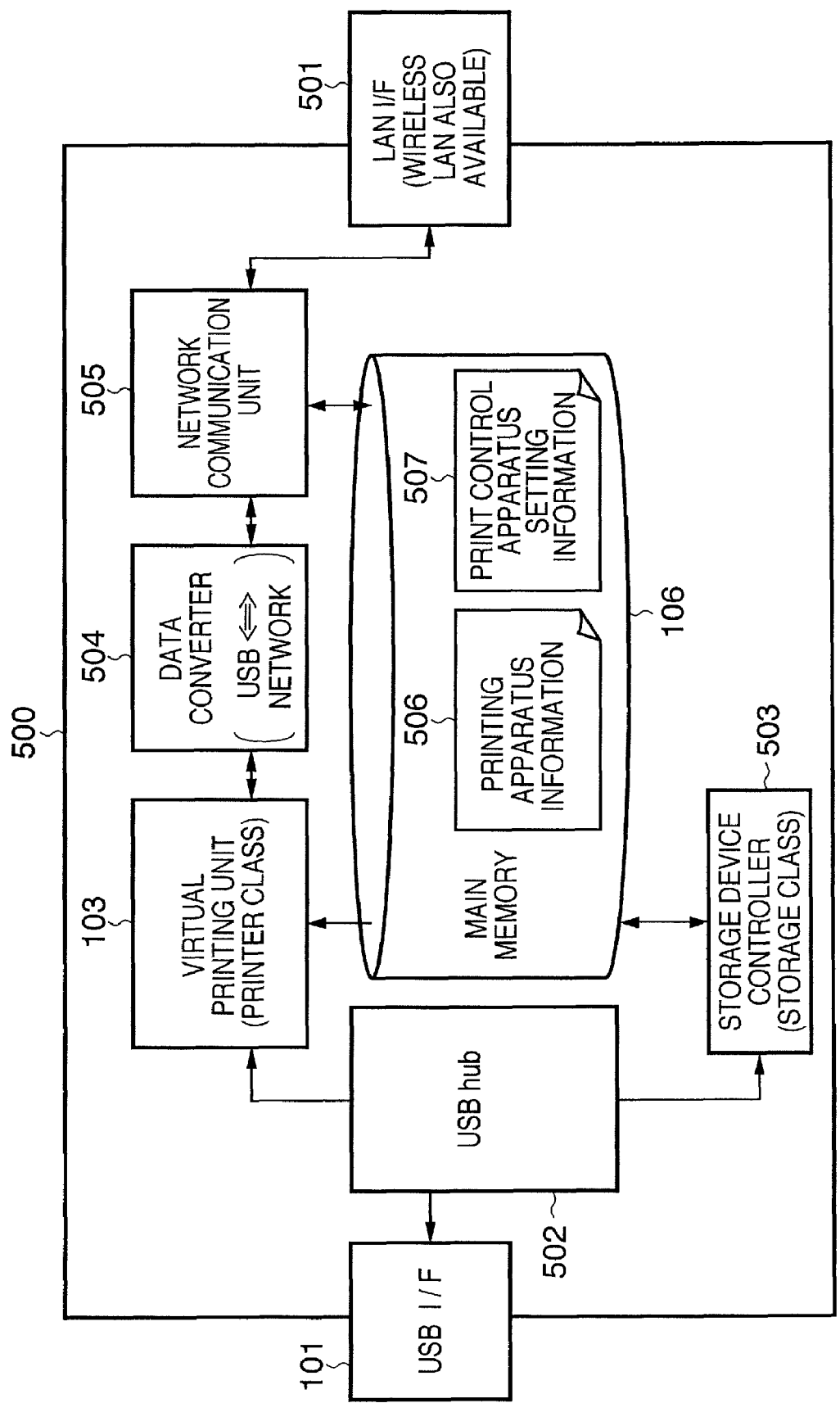
FIG. 7 is a block diagram showing an example of the arrangement of the print control apparatus 500 according to the second embodiment of the present invention.

FIG. 7 shows an example of the arrangement of this print control apparatus 500. This print control apparatus 500 comprises the following blocks.

The connector 101 is located at a USB I/F (host side). With this connector, the print control apparatus can execute communication processing with the information processing apparatus as a host apparatus. The network cable connector 501 is a block expression of a LAN I/F, and can execute communication processing with a printing apparatus 200 via a LAN cable or the like.

The print control apparatus 500 involves two classes: a virtual printing unit 103 as a printer class and a storage device controller 503 as a storage class. A USB hub 502 controls communications to these processors.

The virtual printing unit 103 is a processor which implements the operation of a USB printer class. More specifically, when the host-side connector 101 is connected to the host apparatus, the virtual printing unit 103 executes initialization and communications of USB connection including the same PnP operation as in the case wherein the printing apparatus is connected to the host, in place of the printing apparatus. USB-related information of the printing apparatus 200 in this case will be described later with reference to printing apparatus information 506.

The storage device controller 503 is a controller which implements the operation of a USB storage class. When the host-side connector 101 is connected to the host apparatus, the storage device controller 503 reads or writes information written as the storage class from or in a main memory 106.

The main memory 106 is a storage device which stores data such as print data which is exchanged between the information processing apparatus 300 and printing apparatus 200 to attain a print operation. The main memory 106 stores the following information.

The printing apparatus information 506 includes two pieces of information to be described below possessed by the printing apparatus 200. The first information is identification information used to identify the printing apparatus 200 such as a device ID in the IEEE1284.4 format and the like. This information is exchanged to establish connection between the printing apparatus 200 and information processing apparatus 300 upon initialization of USB connection between the information processing apparatus 300 and printing apparatus 200.

The second information is network setting information. This information is connection information used to connect the printing apparatus 200 via the network and includes an IP address and the like of the printing apparatus 200.

Print control apparatus setting information 507 includes network information required for the print control apparatus 500 to establish network connection. For example, when a LAN environment connected to the network cable connector 501 permanently assigns an IP address to the print control apparatus 500, the print control apparatus setting information 507 holds settings such as that IP address, a subnet mask, and the like. Also, in case of DHCP, the information 507 holds assigned address information.

A data converter 504 is a processor used to convert print data input from the host-side connector 101 to the print control apparatus 500 into a format suited to network communications. In addition, the data converter 504 may also be able to convert information received via the network cable connector 501 into a format suited to USB communications.

A network communication unit 505 communicates information input via the data converter 505 via the network cable connector 501. Also, the network communication unit 505 supplies information acquired via the network cable connector 501 to the data converter 504. Note that information such as the IP address of the print control apparatus 500, that of the printing apparatus 200, and the like, which are required in the operations can be acquired with reference to the printing apparatus information 506 and print control apparatus setting information 507.

Figure 8:
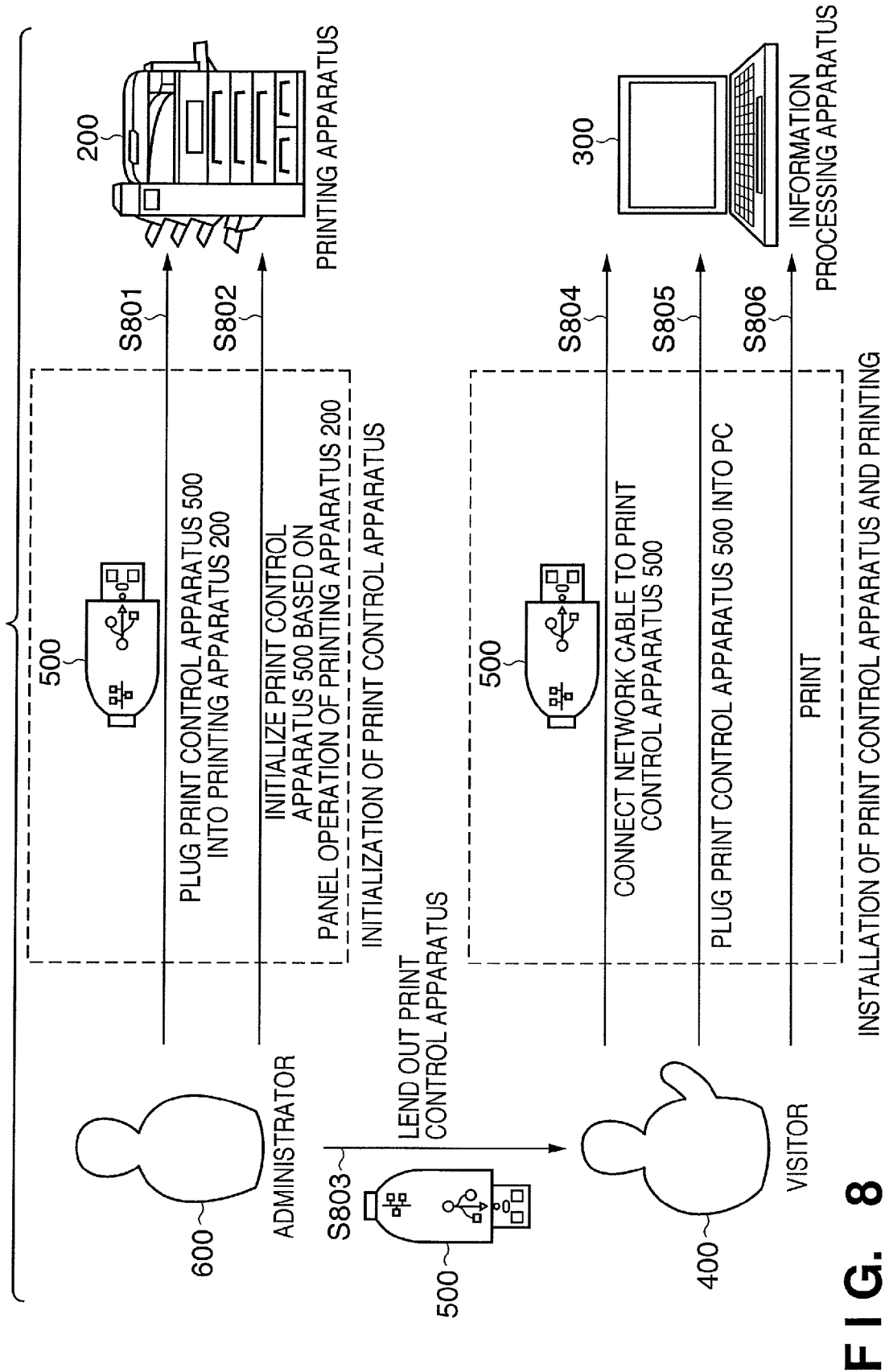
FIG. 8 is a sequence chart showing the procedure of the overall processing according to the second embodiment of the present invention.

A user scenario of this embodiment will be described below with reference to FIG. 8. The user scenario is roughly classified into the following three steps. This user scenario shows a case wherein a visitor 400 brings a notebook type PC into a destination of his or her business trip, and is about to print using a specific printing apparatus. In FIG. 8, an administrator 600 is a network administrator at the destination of the business trip. Note that the administrator 600 and visitor 400 may be the same person.

<Initialization of Print Control Apparatus 500>

In step S801, the administrator 600 plugs the host-side connector 101 of the print control apparatus 500 into the printing apparatus 200 that he or she wants to execute print processing. USB connection is established between the print control apparatus 500 and printing apparatus 200, and the printing apparatus 200 recognizes the print control apparatus 500 as a storage device.

In step S802, the administrator 600 operates a control panel of the printing apparatus 200 to initialize the printing apparatus information 506 and print control apparatus setting information 507 in the main memory 106 via USB communications. This initialization processing will be described later with reference to FIG. 9. In FIG. 8, the print control apparatus 500 is initialized using the printing apparatus 200. Alternatively, another personal computer for management may be separately prepared, and may be used as a substitute of the printing apparatus.

<Lending of Print Control Apparatus 500>

In step S803, the administrator 600 lends out the initialized print control apparatus 500 to the visitor 400.

<Installation of Printer Driver and Print Processing by Print Control Apparatus 500>

In step S804, the visitor 400 connects a network cable to the network cable connector 501. In case of a wireless LAN, this connection is not required. In step S805, the visitor 400 plugs the host-side USB connector 101 of the print control apparatus 500 into the brought information processing apparatus 300. At this time, the PnP function is implemented to install a printer driver corresponding to the information processing apparatus 300.

In step SS06, the visitor 400 executes print processing from a predetermined application in the information processing apparatus 300 using the installed printer driver.

Figure 9:
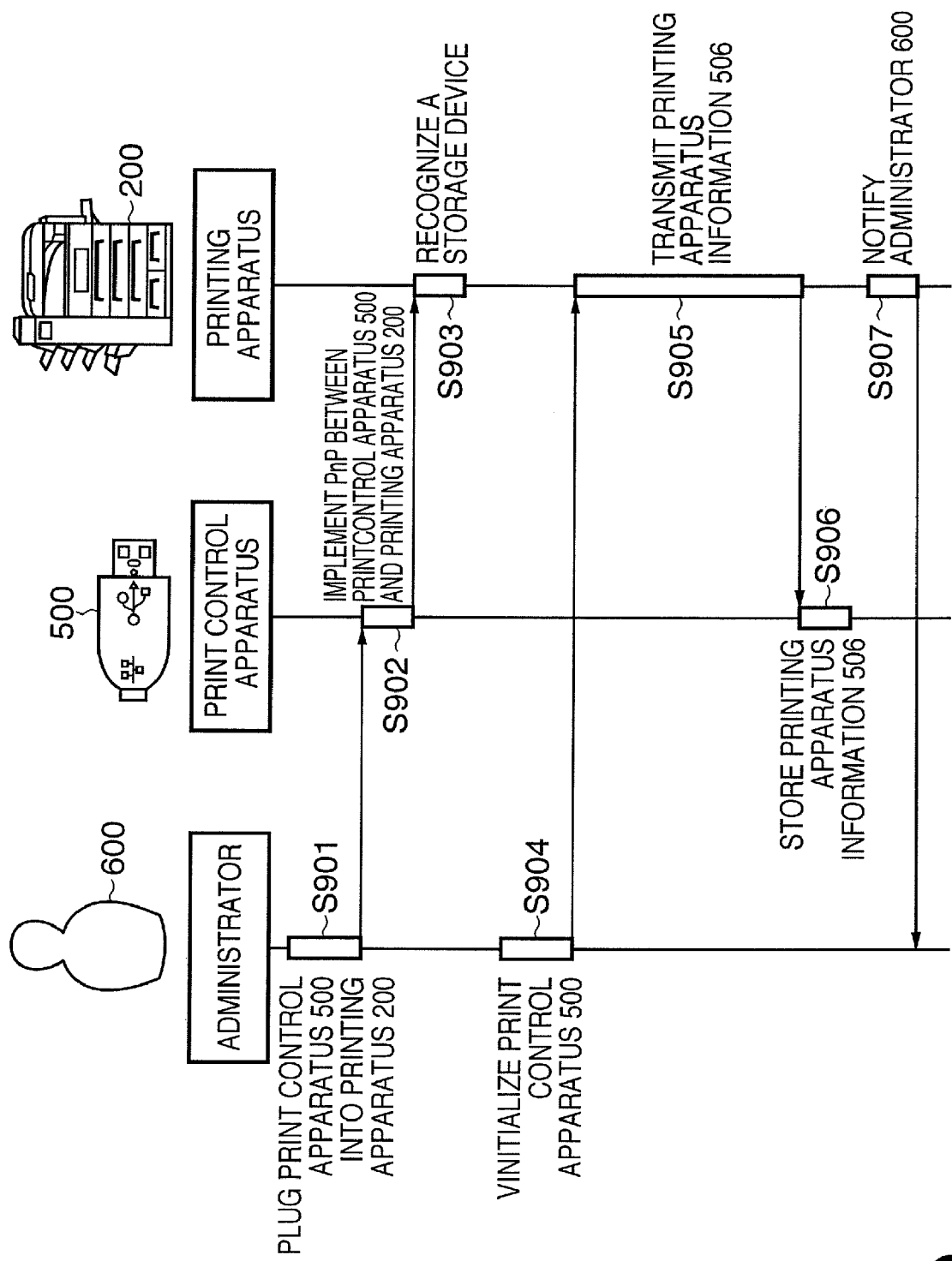
FIG. 9 is a sequence chart associated with the initialization processing of the print control apparatus 500 according to the second embodiment of the present invention.

Details of the initialization sequence of the print control apparatus 500 in step S802 above will be described below with reference to FIG. 9.

In step S901, the administrator 600 plugs the host-side USB connector 101 of the print control apparatus 500 into the printing apparatus 200. In step S902, the print control apparatus 500 implements the PnP function as a storage device (USB memory). In step S903, the printing apparatus 200 recognizes the print control apparatus 500 as a storage device.

Furthermore, in step S904 the print control apparatus 500 is initialized in accordance with the operation on the control panel of the printing apparatus 200 by the administrator 600. In step S905, the printing apparatus 200 transmits the printing apparatus information 506 to the print control apparatus 500 using USB communications. This printing apparatus information 506 includes information such as the device ID in the IEEE1284.4 format and the like required to make USB communications with the printing apparatus, and information such as the IP address and the like required to establish network connection with the printing apparatus 200. Also, this information includes a printer driver for the printing apparatus 200. At this time, when a fixed address is set in the print control apparatus 500, it may be assigned in this stage, and may be passed as the print control apparatus setting information 507 in the main memory 106.

In step S906, the print control apparatus 500 stores the printing apparatus information 506 received from the printing apparatus 200 in its main memory 106. When the fixed address is set in the print control apparatus 500, that address information is stored in the main memory 106 as the print control apparatus setting information 507.

The printing apparatus 200 confirms in step S907 if write processing of information in the main memory 106 of the print control apparatus 500 is complete. If write completion can be confirmed, the printing apparatus 200 notifies the administrator 600 of completion of this initialization processing via the control panel. On the other hand, if write completion cannot be confirmed yet, or if the write processing has failed, the printing apparatus 200 notifies the administrator 600 of a write failure. In this case, the processing from step S901 is executed again.

Figure 10:
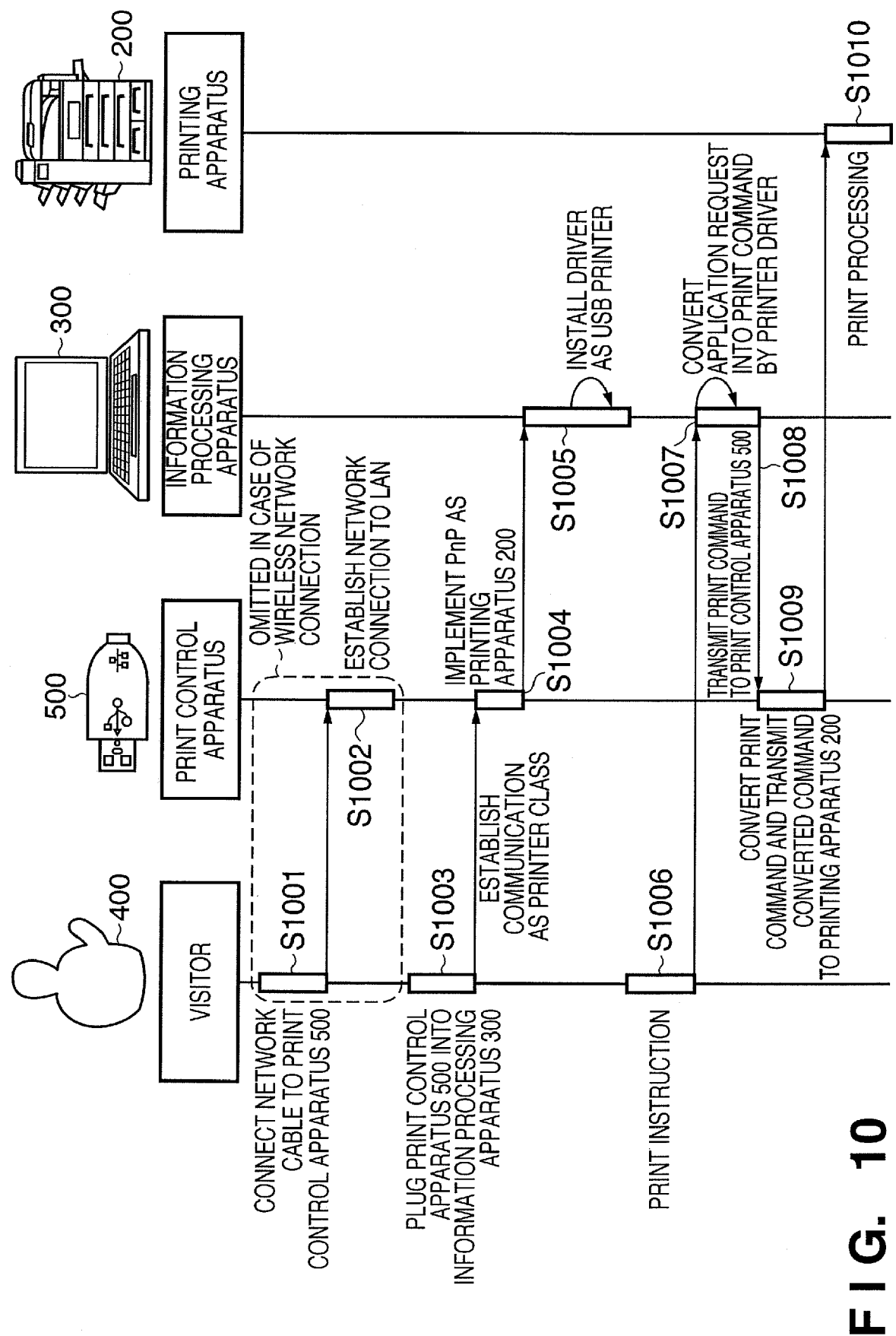
FIG. 10 is a sequence chart associated with the installation processing and print processing of the print control apparatus 500 according to the second embodiment of the present invention.

Details of installation of a printer driver and print processing by the print control apparatus 500 will be described below with reference to FIG. 10.

In step S1001, the visitor 400 connects a network cable to the network cable connector 501. In case of a wireless LAN, this connection is not required. In step S1002, the print control apparatus 500 establishes network connection with a LAN using DHCP or the fixed IP for the print control apparatus 500 received from the printing apparatus 200 in step S905.

Furthermore, in step S1003 the visitor 400 plugs the host-side connector 101 of the print control apparatus 500 into the information processing apparatus 300. In step S1004, the print control apparatus 500 finds valid information as the printing apparatus information 506 in the main memory 106 stored in step S906, and establishes a communication as the printer class.

In step S1005, the information processing apparatus 300 recognizes the print control apparatus 500 as the printer class, and implements the PnP function using the received device ID in the IEEE1284.4 format. Furthermore, the information processing apparatus 300 installs a printer driver corresponding to the device ID in the IEEE1284.4 format. If the printer driver for the printing apparatus 200 has already been installed in the information processing apparatus 300, the installation step of the printer driver is skipped. That is, the print control apparatus 500 installs the printer driver only upon reception of a request from the information processing apparatus 300.

In step S1006, the visitor issues a print instruction from an application in the information processing apparatus 300 using the installed printer driver. In step S1007, the information processing apparatus 300 converts a drawing request from the application into print commands using the printer driver. Furthermore, in step S1008 the information processing apparatus 300 passes the print commands to the print control apparatus 500 via USB connection. In step S1009, the print control apparatus 500 converts the print commands received via USB communications into a data format that can be applied to network communications using the data converter 504. The network communication unit 505 transmits the converted print commands to the printing apparatus 200 via the network cable connector 501 using the IP address stored in the main memory 106 as the printing apparatus information 506.

In step S1010, the printing apparatus 200 executes print processing based on the print commands received via the LAN.

Figure 11A:
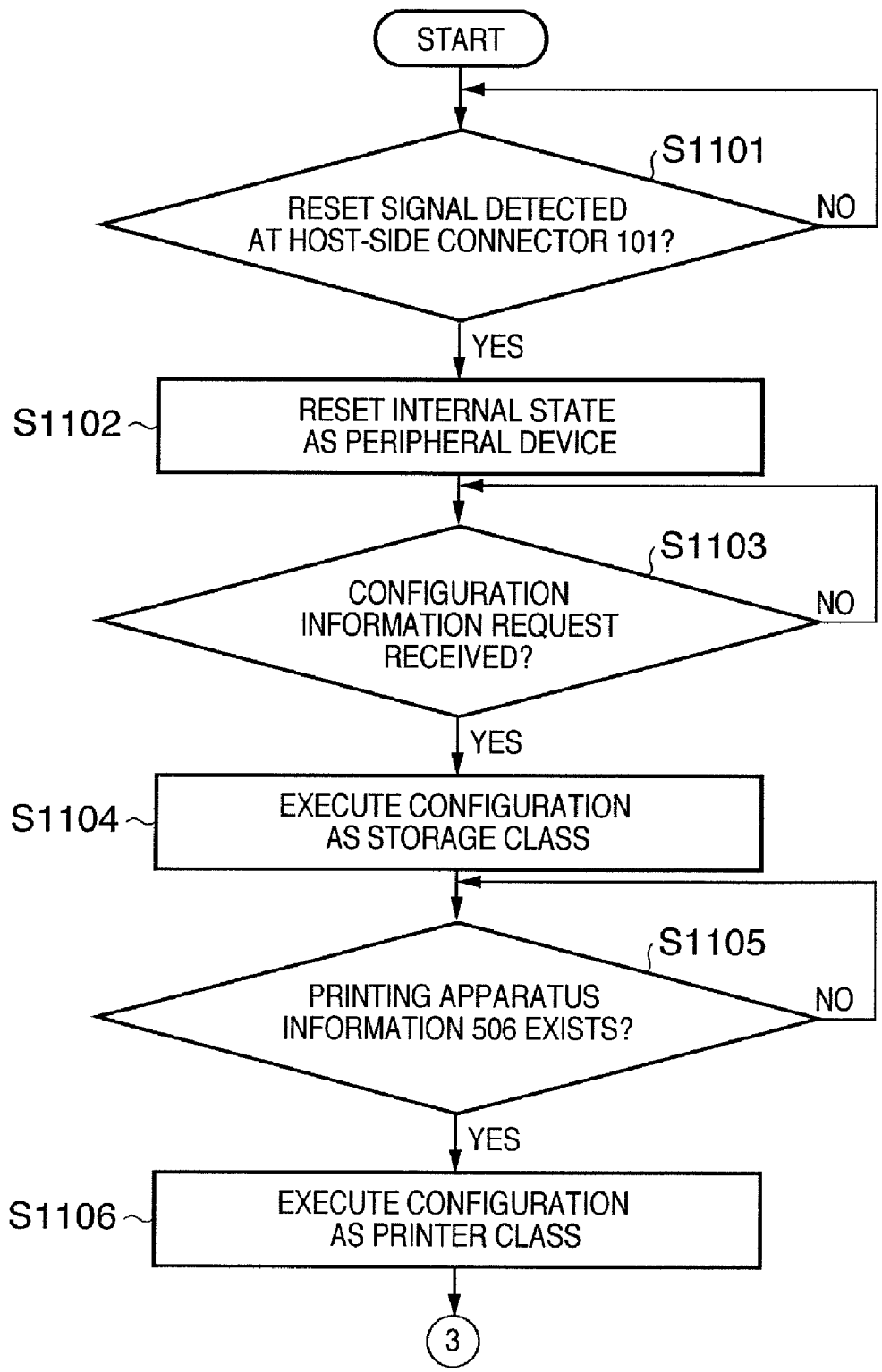
FIGS. 11A and 11B are flowcharts showing an example of the processing of the print control apparatus 500 according to the second embodiment of the present invention.
Figure 11B:
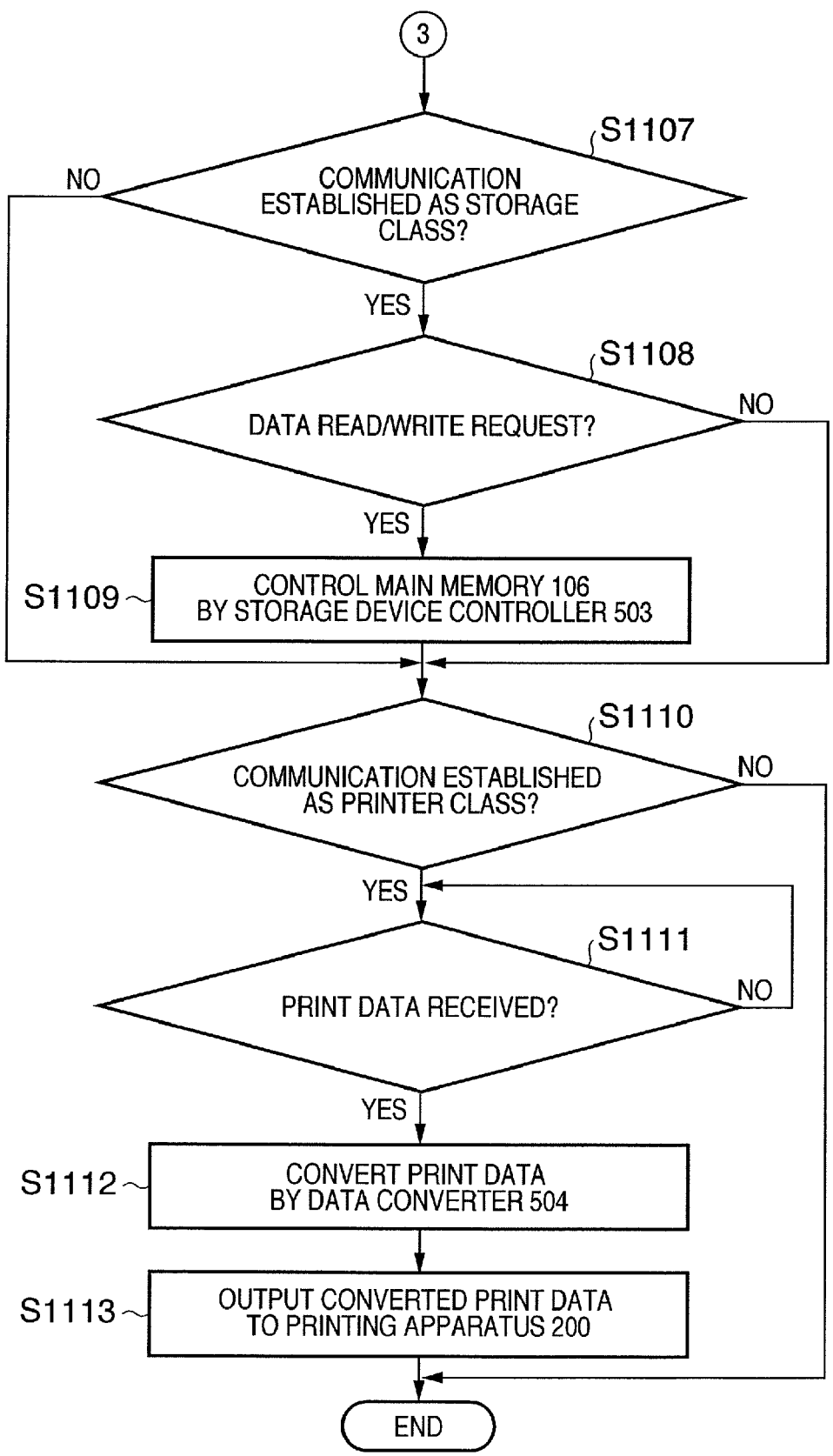

The processing of the print control apparatus 500 according to this embodiment will be described below with reference to FIGS. 11A and 11B. Note that the print control apparatus 500 connected to the information processing apparatus 300 periodically repeats the processing in step S1107 and subsequent steps.

The print control apparatus 500 monitors in step S1101 if a RESET signal is detected at its host-side connector 101. If a RESET signal is detected ("YES" in step S1101), the process advances to step S1102. On the other hand, if a RESET signal is not detected, the print control apparatus 500 continues to monitor.

In step S1102, the print control apparatus 500 recognizes a RESET signal based on the RESET signal, and executes USB communication-related internal reset processing to set a Default state. At this time, the print control apparatus 500 does not erase the printing apparatus information 506 and print control apparatus setting information 507 stored in the main memory 106.

The print control apparatus 500 checks in step S1103 if a configuration request is received from the information processing apparatus 300. If a configuration request is accepted ("YES" in step S1103), the process advances to step S1104. In step S1104, the storage device controller 503 executes configuration with the information processing apparatus 300 to establish USB communications as a storage class.

Furthermore, the print control apparatus 500 checks in step S1105 if the main memory 106 stores the printing apparatus information 506. If the main memory 106 stores the printing apparatus information 506 ("YES" in step S1105), the process advances to step $1106. In step S1106, the virtual printing unit 103 executes configuration with the information processing apparatus 300 to further establish USB communications as a printer class. If neither printing apparatus information 506 is stored nor if it is valid ("NO" in step S1105), the process jumps to step S1107.

The print control apparatus 500 checks in step S1107 if the communications are established as the storage class. If the communications are established as the storage class ("YES"; in step S1107), the process advances to step S1108. On the other hand, if the communications are not established as the storage class ("NO" in step S1107), the process jumps to step S1110.

The print control apparatus 500 checks in step S1108 if a data read/write request is accepted from the information processing apparatus. If a data read/write request is accepted ("YES" in step S1108), the process advances to step S1109. If a data read/write request is not accepted ("NO" in step S1108), the process jumps to step S1110.

In step S1109, the print control apparatus 500 controls the main memory 106 using the storage device controller 503 in response to the data read/write request from the information processing apparatus 300 as a host so as to execute processing corresponding to the request. That is, if a data read request is accepted, the print control apparatus 500 executes control for reading out requested data from the main memory 106. On the other hand, if a data write request is accepted, the print control apparatus 500 executes control for writing requested data in the main memory 106.

The print control apparatus 500 checks in step S1110 if the communications are established as the printer class. If the communications are not established as the printer class ("NO" in step S1110), the print control apparatus 500 ends the processing. On the other hand, if the communications are established as the printer class ("YES" in step S1110), the process advances to step S1111. The print control apparatus 500 checks in step S1111 if the virtual printing unit 103 receives print data from the information processing apparatus 300 via the host-side USB connector 101. If print data is received ("YES" in step S1111), the process advances to step S1112. On the other hand, if print data is not received ("NO" in step S1111), the print control apparatus 500 continues to monitor reception of print data.

In step S1112, the data converter 504 converts the received print data into data for communications in the network communication unit 505. Note that the received print data is print data which is generated using the printer driver for the printing apparatus corresponding to the device ID acquired from the print control apparatus in the information processing apparatus 300. In step S1113, the print control apparatus 500 then transmits the converted print data to the printing apparatus 200 via the network communication unit 505 and the LAN. Note that the print data to be transmitted is appended with the device ID included in the printing apparatus information 506. Upon reception of the print data, the printing apparatus checks if the device ID matches its own device ID. If the two device IDs match, the printing apparatus executes print processing. If the two device IDs do not match, the printing apparatus notifies an error, and does not execute print processing.

As described above, according to this embodiment, using the USB memory which can be used as the print control apparatus, and has the USB connector and network cable connector, a desired printer driver can be installed in the information processing apparatus. Furthermore, print data generated using the printer driver can be provided to the printing apparatus on the network to execute print processing.

In this manner, the installation processing of a desired printer driver and the print processing via the network can be executed using the USB memory that can be used as the print control apparatus without any settings required to connect the information processing apparatus to the network.

Third Embodiment

The above embodiments have exemplified the case wherein the printing apparatus has one printer class. However, an environment in which the printing apparatus internally has a hub, and has a plurality of printer classes is available. In such environment, by logically managing information using device IDs for respective devices, the present invention can be practiced.

In the second embodiment, the wired connection has been explained as the network. However, other network connections such as a wireless connection and the like may be adopted. Furthermore, the above embodiments has described about only print data received from the information processing apparatus 300. However, the print control apparatus 100/500 may acquire and save device configuration information such as a finisher or the like from the printing apparatus 200, and may pass it to the information processing apparatus 300.

Fourth Embodiment

In this embodiment, the main memory 106 of the print control apparatus 100 further stores a job management table used to manage execution status of print processing of print data, so as to control the print processing of the printing apparatus 200 based on the contents of the job management table.

FIG. 12 shows an example of a job management table of this embodiment. A job management table 1200 stores information associated with print processing of print data. More specifically, the job management table 1200 stores a job ID 1201, a job name 1202, the number of pages 1203, a page ID 1204, a page size 1205, a result 1206, the number of output pages 1207, and completion status 1208.

As shown in FIG. 12, the job management table 1200 manages information associated with print data for each job ID 1201. This job ID 1201 is an identifier uniquely assigned to a unit of print data. This job ID 1201 is associated with the job name 1202 and the number of pages 1203. The number of pages 1203 is the number of pages to be scheduled to be printed, and the page ID 1204 is assigned to each page. The page size 1205 and result 1206 are associated with this page ID 1204.

The result 1206 indicates whether or not printing of a page corresponding to the page ID 1204 is complete. If printing is complete, "done" is registered; if printing is not complete yet, "not yet" is registered. The total of the results 1206 is registered in the number of output pages 1207 for each job ID 1201. When the number of output pages 1207 match the number of pages 1203, "Y" is set in completion status 1208; if they do not match, "N" is set.

In this way, with reference to the job management table 1200, not only incomplete jobs can be recognized, but also pages to be output in an only partially output job can be recognized.

Figure 13B:
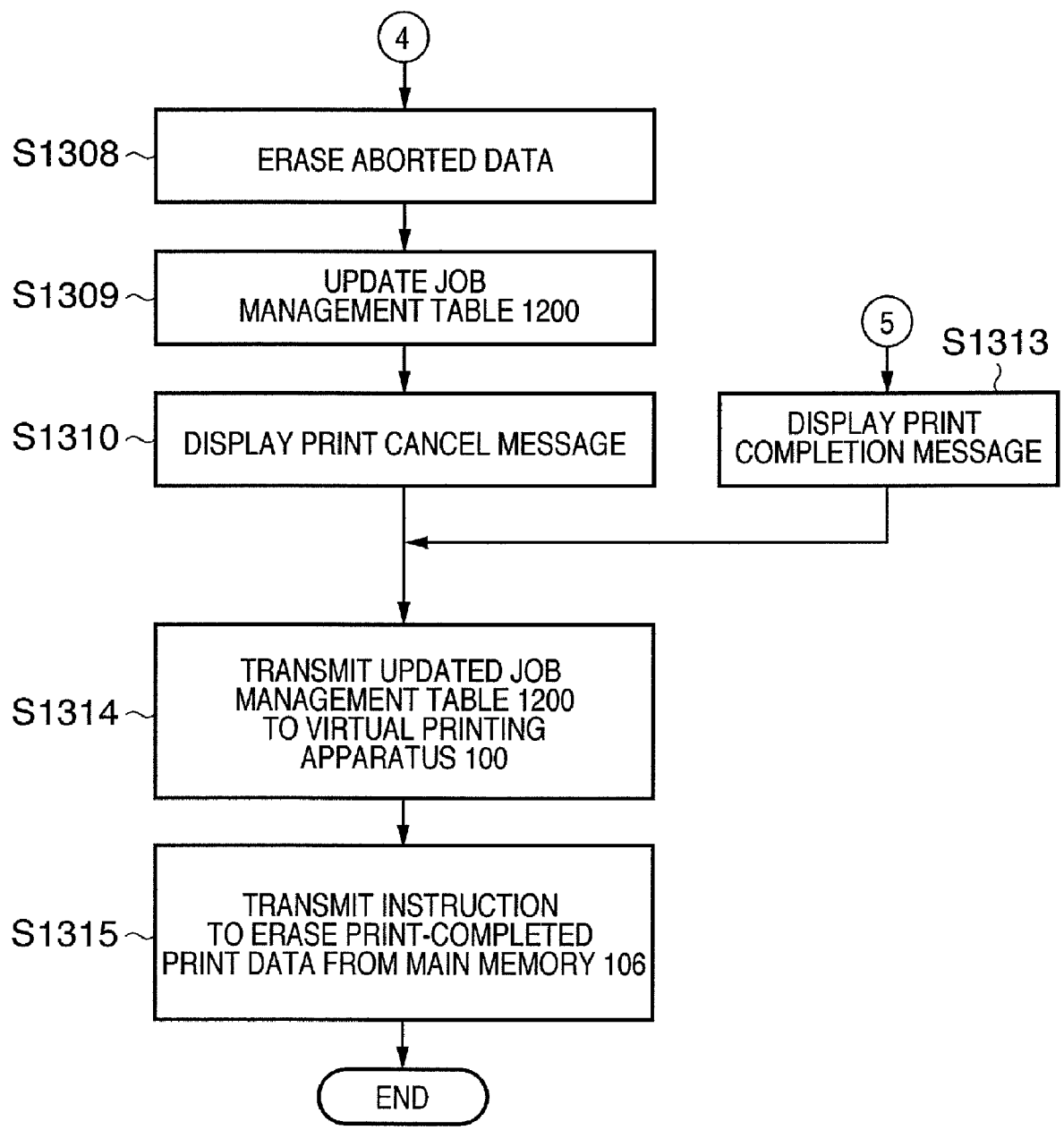

An example of the processing upon execution of the print processing by the printing apparatus 200 using the job management table 1200 will be described below with reference to FIGS. 13A and 13B. The processings shown in FIGS. 13A and 13B are implemented when the system controller controls the operation of the printing apparatus 200 based on a processing program stored in the memory 256.

The printing apparatus 200 monitors in step S1301 if the print control apparatus 100 is connected to a USB connector. If the print control apparatus 100 is connected to the USB connector, the process advances to step S1302 to acquire print data from the main memory 106. Next, in step S1303 the printing apparatus 200 acquires the job management table 1200.

The printing apparatus 200 checks in step S1304 if print data whose print processing is incomplete is registered in the job management table 1200. This checking step can be attained based on the registered contents of completion status 1208 in the job management table 1200. If incomplete print data is registered ("YES" in step S1304), the process advances to step S1305. If incomplete print data is not registered ("NO" in step S1304), the process jumps to step S1313.

In step S1313, the printing apparatus 200 displays, on the display screen 259, a message indicating that the print processing of print data stored in the main memory 106 of the print control apparatus is complete. After that, the process advances to step S1314.

In step S1305, the printing apparatus 200 prints out pages to be output of the incomplete print data for each data. The printing apparatus 200 checks in step S1306 if output of all pages of the incomplete print data is complete. If output of all pages is complete ("YES" in step S1306), the process advances to step S1311. On the other hand, if output of all pages is not complete yet, the process advances to step S1307.

In step S1311, the printing apparatus 200 deletes the print data, all the pages of which have been printed out, from the memory 256. In step S1312, the printing apparatus 200 updates the contents of the result 1206, the number of output pages 1207, and completion status 1208. After that, the process returns to step S1304, and if there is another incomplete print data, the printing apparatus 200 continues print processing of that print data.

The printing apparatus 20.0 checks in step S1307 if a situation that should abort printing has occurred. The situation that should abort printing includes all situations that cannot continue printing such as out of ink, paper jam, out of print sheets, operation errors of the printing apparatus 200, and the like.

If the situation that should abort printing has not occurred ("NO" in step S1307), the process returns to step S1305 to continue the print processing of pages to be output. On the other hand, if the situation that should abort printing has occurred, the process advances to step S1308.

In step S1308, the printing apparatus 200 erases the print data whose processing is aborted from the memory 256. In step S1309, the printing apparatus 200 updates the job management table 1200 in association with the print data whose processing is aborted based on the count value of the printed pages, which is managed by the system controller. That is, the printing apparatus 200 changes the result 1206 to "done" in association with the page IDs 1204 whose printout is complete, and updates the number of output pages 1207 based on the number of output pages until the processing is aborted.

In step S1310, the printing apparatus 200 displays a print cancel message on the display screen 259. After that, the process advances to step S1314.

In step S1314, the printing apparatus 200 transmits the updated job management table 1200 to the print control apparatus 100 to update the table in the main memory 106 in the print control apparatus 100. In step S1315, the printing apparatus 200 transmits an instruction to erase print data whose print processing is complete from the main memory 106 of the print control apparatus 100 based on the job management table 1200 in the memory 256. In response to this instruction, the print data whose print processing is complete is erased from the main memory 106, and data whose print processing is not complete due to abortion is held in the main memory 106.

In the above print processing, the case has been described wherein the size of print sheets in the printing apparatus 200 matches the page size 1205 in print data. By contrast, print data may include page sizes (for some or all pages) that is not supported by the printing apparatus 200. Although not registered in the job management table 1200, print data which includes both monochrome and color pages may exist.

In such case, in step S1305 only pages that can be supported by the printing apparatus 200 (print sheet size, color/ monochrome, etc.) can be selected as pages to be output. After that, the processing ends while pages which have settings that cannot be supported by the printing apparatus 200 are not processed, and the "not yet" results 1206 remain stored in the job management table 1200.

In this way, the printing apparatus which connects the print control apparatus 100 in the meantime can output supported pages, and another printing apparatus can execute print processing of unsupported pages.

Note that this embodiment has explained a modification of the first embodiment, and a modification of this embodiment can also be applied to the second embodiment.

As described above, according to this embodiment, in an environment in which the printing apparatus and information processing apparatus are not connected via a network, even when print processing of some page is aborted or incomplete due to other reasons, the incomplete print processing of these pages can be efficiently restarted.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the aforementioned functions to the system, and reading out and executing the program code stored in the storage medium by the system. In this case, the program code itself read out from the storage medium implements the functions of the aforementioned embodiments, and the storage medium which stores the program code constitutes the present invention. Also, the present invention includes a case wherein an OS (operating system) running on a computer executes some or all of actual processing operations on the basis of an instruction of the program code to implement the aforementioned functions.

Furthermore, the following implementation form is available. That is, the present invention also includes the following case. The program code read out from the storage medium is written in a memory equipped on a function expansion card or function expansion unit which is inserted in or connected to the computer. Then, a CPU or the like equipped on the function expansion card or unit executes some or all of actual processing operations to implement the aforementioned functions.

When the present invention is applied to the storage medium, that storage medium stores the program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-126930, filed Apr. 28, 2006, which is hereby incorporated by reference herein in its entirety.

What is claimed is:

1. A print control apparatus being connectable to a printing apparatus and an information processing apparatus, comprising:

an obtaining unit configured to obtain identification information for specifying a printer driver corresponding to the printing apparatus in response to a connection to the printing apparatus;

a storage unit configured to store the identification information obtained by said obtaining unit;

a transmission unit configured to transmit the identification information stored in said storage unit to the information processing apparatus in response to the connection to the information processing apparatus;

a reception unit configured to receive print data generated in the information processing apparatus using a printer driver specified based on the identification information, from that information processing apparatus; and a second transmission unit configured to transmit the print data received by said reception unit to the printing apparatus.

2. The apparatus according to claim 1, further comprising a deletion unit configured to delete the print data stored in said storage unit after the transmission of that print data to the printing apparatus by said second transmission unit.

3. The apparatus according to claim 1, further comprising:

a determination unit configured to determine whether or not the identification information obtained by said obtaining unit has already been stored in said storage unit, wherein when said determination unit determines that the identification information has already been stored in said storage unit, said second transmission unit transmits the print data.

4. The apparatus according to claim 3, further comprising an inhibition unit configured to inhibit transmission of the print data when said determination unit determines that the identification information has not already stored in said storage unit.

5. The apparatus according to claim 1, further storing a management table for managing execution status of print processing of the print data in the printing apparatus, wherein said second transmission unit transmits the print data based on the execution status of the print processing managed in said management table.

6. The apparatus according to claim 5, wherein said second transmission unit further transmits the management table to the printing apparatus, said storage unit further stores the print data received by said receiving unit, and said management table is updated in accordance with the execution status of the print processing, and the print data is erased from said storage unit in accordance with the execution status.

7. The apparatus according to claim 6, wherein when the print processing associated with the print data is completed in the printing apparatus, that print data is erased from said storage unit, and when the print processing associated with the print data is not completed in the printing apparatus, that print data is not erased from said storage unit.

8. The apparatus according to claim 7, wherein when the print processing is not partially completed, said management table is updated in accordance with print processing contents of completed parts.

9. The apparatus according to claim 1, wherein said apparatus is a USB memory device.

10. A print control apparatus being connectable to a printing apparatus and an information processing apparatus, comprising:

an obtaining unit configured to obtain identification information for specifying a printer driver corresponding to the printing apparatus and that printer driver in response to a connection to the printing apparatus;

a storage unit configured to store the identification information and the printer driver obtained by said obtaining unit;

a transmission unit configured to transmit the identification information and the printer driver stored in said storage unit to the information processing apparatus in response to the connection to the information processing apparatus;

a reception unit configured to receive print data generated in the information processing apparatus using the printer driver specified based on the identification information from the information processing apparatus; and a second transmission unit configured to transmit the print data received by said reception unit to the printing apparatus.

11. A print control apparatus being connectable to a printing apparatus, an information processing apparatus, and a network, comprising:

an obtaining unit configured to obtain identification information for specifying a printer driver corresponding to the printing apparatus and connection information required to connect the printing apparatus via the network in response to a connection to the printing apparatus;

a storage unit configured to store the identification information obtained by said obtaining unit;

a transmission unit configured to transmit the identification information stored in said storage unit to the information processing apparatus in response to the connection to the information processing apparatus;

a reception unit configured to receive print data generated in the information processing apparatus using a printer driver specified based on the identification information, from that information processing apparatus; and a second transmission unit configured to transmit the print data received by said reception unit to the printing apparatus via the network based on the connection information.

12. A method of controlling a print control apparatus being connectable to a printing apparatus and an information processing apparatus, comprising:

an obtaining step of obtaining identification information for specifying a printer driver corresponding to the printing apparatus in response to a connection to the printing apparatus;

a storage step of storing the identification information obtained in the obtaining step in a storage unit;

a transmission step of transmitting the identification information stored in the storage unit to the information processing apparatus in response to the connection to the information processing apparatus;

a reception step of receiving print data generated in the information processing apparatus using a printer driver specified based on the identification information, from that information processing apparatus; and a second transmission step of transmitting the print data received in the reception step to the printing apparatus.

13. A method of controlling a print control apparatus being connectable to a printing apparatus and an information processing apparatus, comprising:

an obtaining step of obtaining identification information for specifying a printer driver corresponding to the printing apparatus and that printer driver in response to a connection to the printing apparatus;

a storage step of storing the identification information and the printer driver obtained in the obtaining step in a storage unit;

a transmission step of transmitting the identification information and the printer driver stored in the storage unit to the information processing apparatus in response to the connection to the information processing apparatus;

a reception step of receiving print data generated in the information processing apparatus using the printer driver specified based on the identification information, from that information processing apparatus; and a second transmission step of transmitting the print data received in the reception step to the printing apparatus.

14. A method of controlling a print control apparatus being connectable to a printing apparatus, an information processing apparatus, and a network, comprising:

an obtaining step of obtaining identification information for specifying a printer driver corresponding to the printing apparatus and connection information required to connect the printing apparatus via the network in response to a connection to the printing apparatus;

a storage step of storing the identification information obtained in the obtaining step in a storage unit;

a transmission step of transmitting the identification information stored in the storage unit to the information processing apparatus in response to the connection to the information processing apparatus;

a reception step of receiving print data generated in the information processing apparatus using a printer driver specified based on the identification information, from that information processing apparatus; and a second transmission step of transmitting the print data received in the reception step to the printing apparatus via the network based on the connection information.

15. A non-transitory computer-readable medium encoded with a program for making a computer execute a method of controlling a print control apparatus being connectable to a printing apparatus and an information processing apparatus, said method comprising:

an obtaining step of obtaining identification information for specifying a printer driver corresponding to the printing apparatus in response to a connection to the printing apparatus;

a storage step of storing the identification information obtained in the obtaining step in a storage unit;

a transmission step of transmitting the identification information stored in the storage unit to the information processing apparatus in response to the connection to the information processing apparatus;

a reception step of receiving print data generated in the information processing apparatus using a printer driver specified based on the identification information, from that information processing apparatus; and a second transmission step of transmitting the print data received in the reception step to the printing apparatus.

16. A non-transitory computer-readable medium encoded with a program for making a computer execute a method of controlling a print control apparatus being connectable to a printing apparatus and an information processing apparatus, said method comprising:

an obtaining step of obtaining identification information for specifying a printer driver corresponding to the printing apparatus and that printer driver in response to a connection to the printing apparatus;

a storage step of storing the identification information and the printer driver obtained in the obtaining step in a storage unit;

a transmission step of transmitting the identification information and the printer driver stored in the storage unit to the information processing apparatus in response to the connection to the information processing apparatus;

a reception step of receiving print data generated in the information processing apparatus using the printer driver specified based on the identification information, from that information processing apparatus; and a second transmission step of transmitting the print data received in the reception step to the printing apparatus.

17. A non-transitory computer-readable medium encoded with a program for making a computer execute a method of controlling a print control apparatus being connectable to a printing apparatus, an information processing apparatus, and a network, said method comprising:

an obtaining step of obtaining identification information for specifying a printer driver corresponding to the printing apparatus and connection information required to connect the printing apparatus via the network in response to a connection to the printing apparatus;

a storage step of storing the identification information obtained in the obtaining step in a storage unit;

a transmission step of transmitting the identification information stored in the storage unit to the information processing apparatus in response to the connection to the information processing apparatus;

a reception step of receiving print data generated in the information processing apparatus using a printer driver specified based on the identification information, from that information processing apparatus; and a second transmission step of transmitting the print data received in the reception step to the printing apparatus via the network based on the connection information.

* * * * *